United States Patent
Inamura et al.

(10) Patent No.: US 9,948,830 B2
(45) Date of Patent: Apr. 17, 2018

(54) COLOR ESTIMATION SYSTEM, SEPARATION DATA GENERATION SYSTEM, COLOR ESTIMATION METHOD AND SEPARATION DATA GENERATION METHOD

(71) Applicant: TOPPAN PRINTING CO., LTD., Tokyo (JP)

(72) Inventors: Takashi Inamura, Tokyo (JP); Takaya Tanaka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/171,625

(22) Filed: Jun. 2, 2016

(65) Prior Publication Data
US 2016/0360072 A1    Dec. 8, 2016

(30) Foreign Application Priority Data
Jun. 3, 2015   (JP) .................................. 2015-113069

(51) Int. Cl.
*H04N 1/60* (2006.01)
(52) U.S. Cl.
CPC ............. *H04N 1/605* (2013.01); *H04N 1/603* (2013.01); *H04N 1/6016* (2013.01); *H04N 1/6041* (2013.01)
(58) Field of Classification Search
CPC .................................................... H04N 1/4074
See application file for complete search history.

(56) References Cited

U.S. PATENT DOCUMENTS

| | | | | |
|---|---|---|---|---|
| 5,162,899 A | * | 11/1992 | Naka | H04N 1/6033 358/501 |
| 5,265,200 A | * | 11/1993 | Edgar | G06T 5/009 345/589 |
| 5,481,655 A | * | 1/1996 | Jacobs | H04N 1/6011 358/1.9 |
| 5,903,665 A | * | 5/1999 | Tanaka | H04N 1/603 382/162 |
| 5,909,506 A | * | 6/1999 | Goto | H04N 1/60 382/162 |
| 5,978,107 A | * | 11/1999 | Murai | H04N 1/603 358/518 |
| 6,377,366 B1 | * | 4/2002 | Usami | H04N 1/6022 358/520 |

(Continued)

FOREIGN PATENT DOCUMENTS

JP   2011-126244 A   6/2011

*Primary Examiner* — Ted Barnes
(74) *Attorney, Agent, or Firm* — Foley & Lardner LLP

(57) ABSTRACT

A color estimation system provided with a correlation memory unit storing a correlation model that accepts an image or information of image, and outputting an ink-color set that is a color combination of inks used in reproducing the image by printing; and a color combination extracting unit that extracts the ink-color set corresponding to a print image, which is an image to be printed, by providing an input of the print image or image information of the print image to the correlation model. The correlation model is generated by performing machine learning that generates a correlation between the image information and the ink-color set such that the ink-color set is outputted based on the image information, using a reference image of which the ink-color set necessary for a printing is known in advance.

11 Claims, 19 Drawing Sheets

(56) References Cited

U.S. PATENT DOCUMENTS

| | | | | |
|---|---|---|---|---|
| 6,480,299 B1* | 11/2002 | Drakopoulos | H04N 1/6033 | 358/1.1 |
| 7,652,789 B2* | 1/2010 | Berns | H04N 1/6033 | 345/598 |
| 7,706,604 B2* | 4/2010 | Berns | H04N 1/6033 | 358/518 |
| 2003/0185457 A1* | 10/2003 | Campbell | G06T 5/009 | 382/254 |
| 2005/0083346 A1* | 4/2005 | Takahashi | H04N 1/6033 | 345/600 |
| 2005/0111017 A1* | 5/2005 | Takahashi | H04N 1/6027 | 358/1.9 |
| 2005/0140997 A1* | 6/2005 | Shirasawa | G06K 15/02 | 358/1.9 |
| 2007/0229574 A1* | 10/2007 | Kaneko | B41J 2/17566 | 347/19 |
| 2007/0291312 A1* | 12/2007 | Kaneko | H04N 1/6033 | 358/2.1 |
| 2008/0089581 A1* | 4/2008 | Pitie | H04N 1/4074 | 382/162 |
| 2009/0080009 A1* | 3/2009 | Takahashi | H04N 1/6027 | 358/1.9 |
| 2009/0168084 A1* | 7/2009 | Seto | H04N 1/54 | 358/1.9 |
| 2012/0113446 A1* | 5/2012 | Seto | H04N 1/54 | 358/1.9 |
| 2012/0243011 A1* | 9/2012 | Fukuda | H04N 1/6033 | 358/1.9 |
| 2015/0002904 A1* | 1/2015 | Nakamura | G06K 15/1872 | 358/3.01 |
| 2015/0062673 A1* | 3/2015 | Horita | H04N 1/54 | 358/515 |
| 2015/0062674 A1* | 3/2015 | Horita | H04N 1/52 | 358/515 |

* cited by examiner

<SPOT COLOR PROFILE TABLE>

| L | a | b | .... | DOT AREA RATIO OF INK COLOR 1 | DOT AREA RATIO OF INK COLOR 2 | DOT AREA RATIO OF INK COLOR 3 |
|---|---|---|---|---|---|---|
| *** | *** | *** | .... | ***** | ***** | ***** |
| ⋮ | ⋮ | ⋮ | | ⋮ | ⋮ | ⋮ |

FIG.6

<REFERENCE IMAGE SEPARATION DATA TABLE FOR EVERY REFERENCE IMAGE>

| SEPARATION DATA IDENTIFICATION INFORMATION | INK COLOR |
|---|---|
| ***** | ***** |
| ⋮ | ⋮ |

FIG.7

<REFERENCE IMAGE SPOT COLOR PROFILE TABLE>

| DOT AREA RATIO OF INK COLOR 1 | DOT AREA RATIO OF INK COLOR 2 | DOT AREA RATIO OF INK COLOR 3 | .... | L | a | b |
|---|---|---|---|---|---|---|
| ***** | ***** | ***** | .... | *** | *** | *** |
| ⋮ | ⋮ | ⋮ | | ⋮ | ⋮ | ⋮ |

FIG.8

<REFERENCE IMAGE INFORMATION EXTRACTING DATA TABLE>

| PIXEL COORDINATE | DOT AREA RATIO OF INK COLOR 1 | DOT AREA RATIO OF INK COLOR 2 | DOT AREA RATIO OF INK COLOR 3 | ... | L | a | b | R | G | B |
|---|---|---|---|---|---|---|---|---|---|---|
| ***** | ***** | ***** | ***** | ... | *** | *** | *** | *** | *** | *** |
| .... | .... | .... | .... | | .... | .... | .... | .... | .... | .... |

FIG.9

<REFERENCE IMAGE SET DATA TABLE>

| REFERENCE IMAGE IDENTIFICATION INFORAMTION | REFERENCE IMAGE INDEX | INK COLOR SET | REFERENCE IMAGE FEATURE QUANTITY |
|---|---|---|---|
| ***** | ***** | ***** | ***** |
| ⋮ | ⋮ | ⋮ | ⋮ |

FIG.18

| | APPEARANCE RATIO (PRIMARY DIMENSION) | | APPEARANCE RATIO (SUBSIDIARY DIMENSION) | REGION |
|---|---|---|---|---|
| C | $\alpha 0*(1-\beta 0)$ | C100% M0% | $\alpha 1/(\alpha 1+\alpha 2)$ | Q1 |
| | | C50% M0% | $1-\alpha 1/(\alpha 1+\alpha 2)$ | Q2 |
| M | $(1-\alpha 0)*\beta 0$ | C0% M100% | $\beta 1/(\beta 1+\beta 2)$ | Q3 |
| | | C0% M50% | $1-\beta 1/(\beta 1+\beta 2)$ | Q4 |
| CM | $\alpha 0*\beta 0$ | C100% M100% | $\alpha 1/(\alpha 1+\alpha 2)*\beta 1/(\beta 1+\beta 2)$ | Q5 |
| | | C100% M50% | $\alpha 1/(\alpha 1+\alpha 2)*[1-\beta 1/(\beta 1+\beta 2)]$ | Q6 |
| | | C50% M100% | $[1-\alpha 1/(\alpha 1+\alpha 2)]*\beta 1/(\beta 1+\beta 2)$ | Q7 |
| | | C50% M50% | $[1-\alpha 1/(\alpha 1+\alpha 2)]*[1-\beta 1/(\beta 1+\beta 2)]$ | Q8 |
| W | $(1-\alpha 0)*(1-\beta 0)$ | C0% M0% | 1 | Q9 |

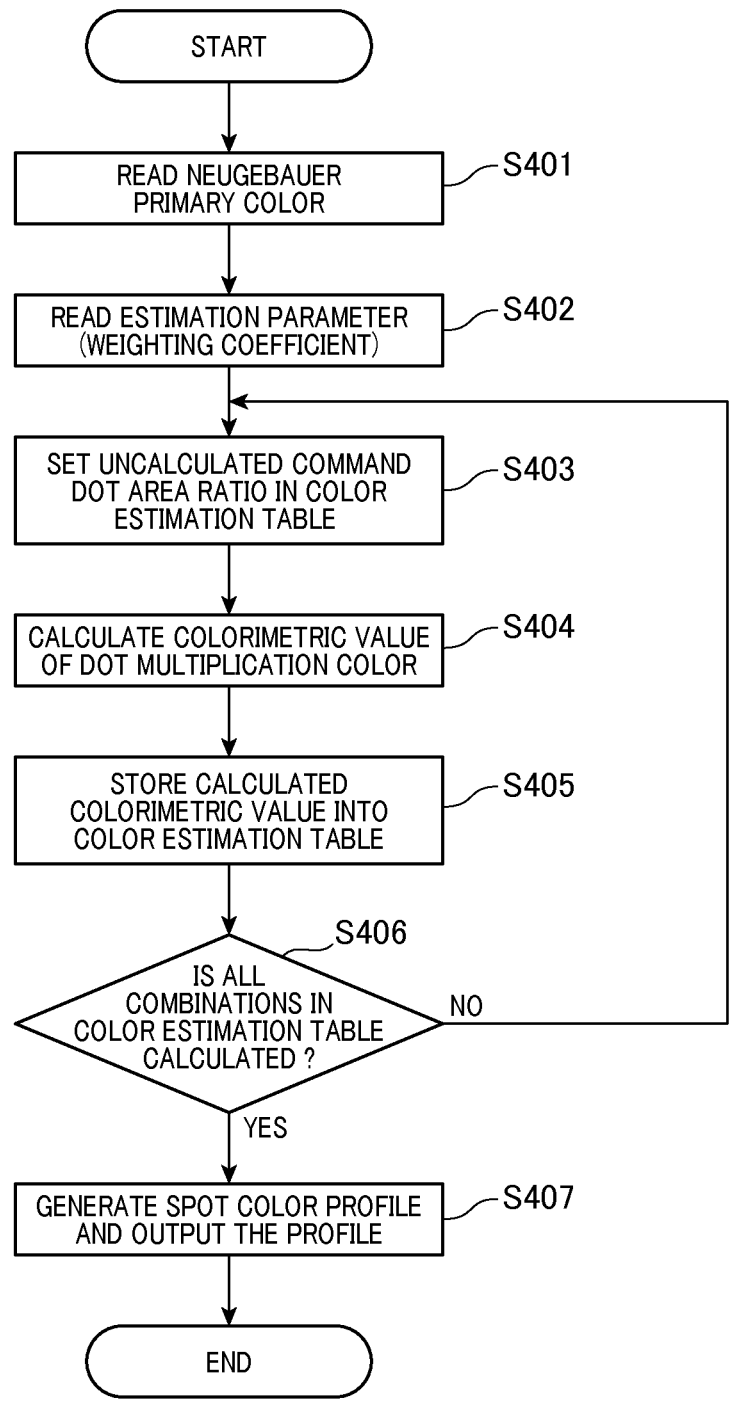

COLOR ESTIMATION SYSTEM, SEPARATION DATA GENERATION SYSTEM, COLOR ESTIMATION METHOD AND SEPARATION DATA GENERATION METHOD

CROSS-REFERENCE TO RELATED PATENT APPLICATIONS

This application claims the benefit of priority of Japanese Application No. 2015-113069, filed Jun. 3, 2015, the entire contents of which are hereby incorporated by reference.

TECHNICAL FIELD

The present invention relates to a color estimation system that estimates a color of ink used when a printing machine performs printing, a separation data generation system, a color estimation method and a separation data generation method.

BACKGROUND

Conventionally, color printing has been performed by recoating with separate plates which are multi color printing plates. For example, JP-A-2011-126244 discloses a printing technique in which inks having colors corresponding to respective separation plates are added to the separation plates to perform recoating, thereby performing color printing.

Accordingly, when making printed matter, separation data has to be generated for respective inks used for reproducing color of the image during the printing, so as to obtain color of the image in the printed matter.

In a state where the separation data for the printed matter are produced, if ink-colors used for printing the printed matter are known in advance, the separation data used for the printing can readily be generated. However, usually, when producing the separation data of the printed matter, an operator confirms the color of the printed matter and determines which colors can be used for the printing, and then the operator produces the separation data used for the printing. Accordingly, depending on the operation skill of each operator, there is a concern that determination of ink colors takes time, or the accurate color cannot be set for the printing.

SUMMARY OF THE INVENTION

The present invention has been achieved in light of the above-mentioned circumstances and provides a color estimation system in which an ink-color suitable for an image of a printed matter can readily be estimated with high accuracy, thereby reducing manufacturing steps of producing separation data, a separation data generation system, a color estimation method and a separation data generation method.

A color estimation system according to the present invention is provided with a correlation memory unit that stores a correlation model that accepts an input of an image or information of the image, and outputs an ink color set that is a color combination of inks used in reproducing the image by printing; and a color combination extracting unit that extracts the ink-color set corresponding to a print image, which is an image to be printed, by providing an input of the print image or image information of the print image to the correlation model.

The correlation model is generated by performing machine learning that establishes correlation between the image information and the ink-color set such that the ink-color set is outputted based on the image information, using a reference image of which the ink-color set necessary for printing is known in advance.

According to the color estimation system of the present invention, the image information refers to an image feature quantity defined as any one of: a histogram composed of numerical values corresponding to respective coordinates in a predetermined color space of each pixel in the image; numerical values corresponding to respective coordinates in a predetermined color space of a predetermined plurality of pixels in the image; and numerical values corresponding to respective coordinates in a predetermined color space of a representative color in a predetermined region.

According to the color estimation system of the present invention, the histogram is expressed by a function, the histogram having an envelope shape expressed by synthesizing a plurality of functions, the functions having respective coefficients used as the image feature quantity.

According to the color estimation system of the present invention, a print color is estimated using separation data of the reference image and the ink-color set, thereby estimating colorimetric values in a printed reference image. The estimated reference image or the image feature quantity of the estimated reference image, and the ink-color set are used for data of the machine learning.

According to the color estimation system of the present invention, the print color of the printed reference image is estimated based on colors of the inks or a spectral reflectance using a Kubelka-Munk equation, a core fringe model and a Neugebauer model.

According to the color estimation system of the present invention, a color profile is set being correlated to a combination of dot area ratios of the inks in the ink-color set, the color profile being used for the print color in the ink-color set of an image desired to be reproduced by the printing.

According to a separation data generation system of the present invention, the separation data is generated being correlated to a combination of the colors of the inks in the ink-color set estimated by any of above-described color estimation systems, the separation data being generated so as to produce a plate for each colors in the ink-color set.

A color estimation method according to the present invention includes steps of: setting a print image which is an image to be printed or image information of the print image, to be an input; providing the input to a correlation model, the correlation model being configured to accept image or image information and output an ink-color set as a combination of an ink used when the image is reproduced in printing; and extracting the ink-color set corresponding to the print image from the correlation model in a color combination extracting process.

The correlation model is generated by performing machine learning that generates a correlation between the image information and the ink-color set such that the ink-color set is outputted based on the image information, using a reference image of which the ink-color set necessary for a printing is known in advance.

A separation data generation method according to the present invention includes a separation data generation process that generates separation data for producing a plate for each color, being correlated to a color combination of the inks in the ink-color set estimated in the above-described color estimation method.

As described, according to the present invention, the color of ink corresponding to the image of the printed matter can readily be estimated accurately. Also, a color estimation system that reduces a process for generating a separation plate, a separation data generation system, a color estimation method and a separation data generation method can be provided.

BRIEF DESCRIPTION OF THE DRAWINGS

In the accompanying drawings:

FIG. 6 is a diagram showing a configuration example of a reference image separation data table stored in a table database 21;

FIG. 7 is a diagram showing a configuration example of a reference image spot color profile table stored in the spot color profile database 23;

FIG. 8 is a diagram showing a configuration example of a reference image information extraction data table stored in the table database 21;

FIG. 9 is a diagram showing a configuration example of a reference image set data table stored in the table database 21;

FIG. 18 is a diagram of a table showing calculation results for appearance ratios in areas Q1 to Q9 shown in FIGS. 17A and 17B;

FIG. 19 is a flowchart showing an operation example of a generation process of a color estimation table performed by a color estimation table generation unit 109 according to the present embodiment;

DESCRIPTION OF THE REPRESENTATIVE EMBODIMENTS

In the present invention, when printing an image (hereinafter referred to as a print image), the ink-color set used for printing to reproduce the color of the image is estimated by using color information as image information, such as a colorimetric value or the like of each pixel in the print image, and separation data (e.g., separation plate data constituted based on dot area ratios of the pixels) is generated for each estimated ink-color.

A neural network model is used in the embodiment described in the following, as a correlation model representing a correlation between the above-described image information of the print image and the ink-color. However, any correlation models using machine learning other than the neural network model may be employed as long as the correlation model shows a correlation between an input value and an output value, and includes a function that outputs an output value of a most appropriate result with respect to an input value condition, e.g., a regression analysis model and a multiple regression analysis.

In the machine learning, colorimetric values of the pixels in a reference image are estimated from the separation data of the reference image, using separation data having known ink-colors, and information of the reference image is extracted so as to generate a correlation model in accordance with a plurality of pieces of reference image information (e.g., image feature quantity which is described later) and a combination of the ink-colors of respective reference image. The correlation model represents correlation between the image information and a combination (hereinafter referred to as an ink-color set) of the ink-color (colorimetric values L*a*b* of solid color or information about a formulation ratio of primary color inks which determines the ink-color may be used).

Thus, the image information of the print image is given as an input value to the above described correlation model, thereby obtaining an output value which is an ink-color set to print the print image. Hence, the separation data is generated to print the print image with the ink-color set.

Figure 1:
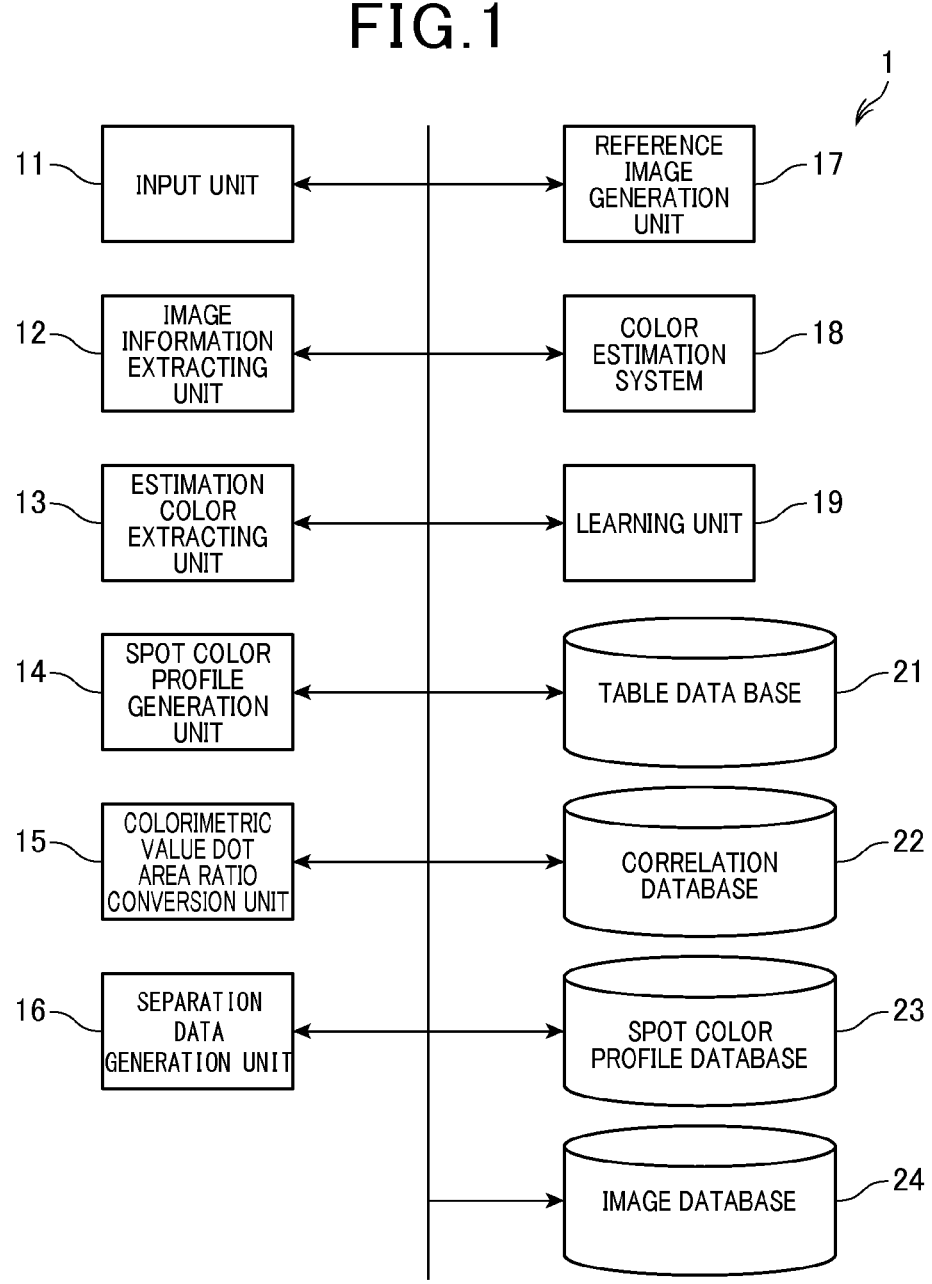
FIG. 1 is a block diagram showing a configuration example of a color estimation system according to the first embodiment of the present invention.

With reference to the drawings, one embodiment of the present invention will be described. FIG. 1 is a block diagram showing a configuration example of a color estimation system 1. In FIG. 1, the color estimation system 1 is provided with a input unit 11, an image information extracting unit 12, an estimation color extracting unit 13, a spot color profile generation unit 14, a colorimetric value dot area ratio conversion unit 15, a separation data generation unit 16, a reference image generation unit 17, a color estimation system 18, a learning unit 19, a table database 21, a correlation database 22, and a spot color profile database 23.

The input unit 11 is connected to, for example, an external computer and accepts data from the user, such as image data of the print image, and a command used for processes in machine learning. Also, the input unit 11 includes an input means such as a keyboard or a touch panel. The input unit 11 may be configured such that input data accepted by the input means is outputted to respective sections in the color estimation system 1, in which the input data includes a command used by a user during machine learning.

The image information extracting unit 12 converts, as information of the pixels of the print image and the reference image, the colorimetric value L*a*b* (coordinate values in Lab color space), RGB (i.e., Red, Green, Blue) values of the three primary colors which is a general format for storing the image data as digital data of the pixels of the image data, and C, M, Y, K values showing fundamental colors of the printing. Since the conversion can be accomplished by a known general technique such as an ICC profile, detailed explanation is omitted here. As the information of the pixel colors, colorimetric values L*a*b* or C, M, Y, K values can be used. However, the RGB values will be used in the following description.

The image information extracting unit 12 generates histograms of an appearance frequency of R value, G value and B value of each pixel in the image, for example. In the present embodiment, the shape of the envelope in each histogram (a line enveloping upper ends of columns (vertical bars of the histogram)) is approximated by a plurality of functions. The coefficients of the functions are used for an image feature quantity.

Figure 2:
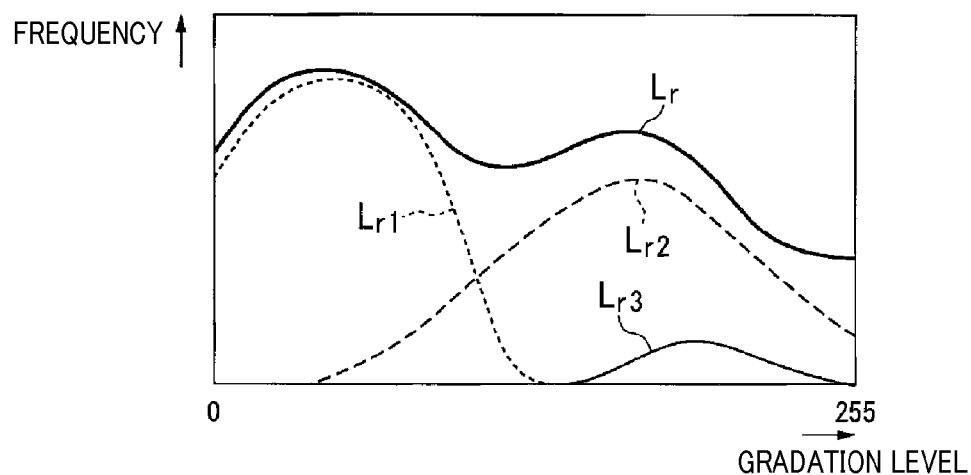
FIG. 2 is a graph showing an approximation of an envelope curve of, for example, R-value histogram in an RGB value.

FIG. 2 is a diagram showing an approximation of the envelope of the histogram of the R value, for example. The horizontal axis shows a gradation level (256 gradations from 0 to 255) of the R value and the vertical axis shows an appearance frequency (number) of the gradation levels. In order to approximate an envelope $L_r$ of the histogram shown in FIG. 2, functions of a curve $L_{r1}$, a curve $L_{r2}$, and a curve $L_{r3}$ are used. Each of the functions of curves $L_{r1}$, $L_{r2}$, $L_{r3}$ is expressed, for example, as an exponential function as shown in an equation (1) below.

[Math 1]

$$f(x) = a \cdot \exp\left(-\frac{(x-b)^2}{2c^2}\right) \quad (1)$$

In the above (1) equation, the coefficients a, b and c are used, to generically show these values. The coefficients in a function showing the curve $L_{r1}$ used for approximation of the envelope $L_r$ of R value shown in FIG. 2 include a coefficient $a_{r1}$, a coefficient $b_{r1}$ and a coefficient $c_{r1}$. Similarly, the coefficients in a function showing the curve $L_{r2}$ used for approximation of the envelope $L_r$ include a coefficient $a_{r2}$, a coefficient $b_{r2}$ and a coefficient $c_{r2}$. Also, the coefficients in a function showing the curve $L_{r3}$ used for approximation of the envelope $L_r$ include a coefficient $a_{r3}$, a coefficient $b_{r3}$ and a coefficient $c_{r3}$. Here, the function expressing each of the curve $L_{r1}$, the curve $L_{r2}$ and the curve $L_{r3}$ is the above-described equation (1). There are 9 coefficients, as mentioned above, used for the functions to approximate the envelope $L_r$.

Similar to the above-described R value, the coefficients in the functions showing curves $L_{g1}$, $L_{g2}$ and $L_{g3}$ used for approximating an envelope $L_g$ of a G value histogram have 9 coefficients which are a coefficient $a_{g1}$, a coefficient $b_{g1}$, a coefficient $c_{g1}$, a coefficient $a_{g2}$, a coefficient $b_{g2}$, a coefficient $c_{g2}$, a coefficient $a_{g3}$, a coefficient $b_{g3}$ and a coefficient $c_{g3}$.

Moreover, the coefficients in the functions showing curves $L_{b1}$, $L_{b2}$ and $L_{b3}$ used for approximating an envelope $L_b$ of the B value histogram have 9 coefficients which are a coefficient $a_{b1}$, a coefficient $b_{b1}$, a coefficient $c_{b1}$, a coefficient $a_{b2}$, a coefficient $b_{b2}$, a coefficient $c_{b2}$, a coefficient $a_{b3}$, a coefficient $b_{b3}$ and a coefficient $c_{b3}$.

Therefore, the coefficients in the functions which approximate the envelopes $L_r$, $L_g$ and $L_b$ of the histograms corresponding to the R value, the G value and the B value, respectively, in the RGB values are 27 (=9 (coefficients)×3 (RGB)) coefficients. These 27 coefficients serve as parameters of the image feature quantity extracted from the image information of the image as shown in an equation (2) below.

[Math 2]

$$\underbrace{\begin{matrix} R_{para}: a_{r1}, b_{r1}, c_{r1}, a_{r2}, b_{r2}, c_{r2}, a_{r3}, b_{r3}, c_{r3} \\ G_{para}: a_{g1}, b_{g1}, c_{g1}, a_{g2}, b_{g2}, c_{g2}, a_{g3}, b_{g3}, c_{g3} \\ B_{para}: a_{b1}, b_{b1}, c_{b1}, a_{b2}, b_{b2}, c_{b2}, a_{b3}, b_{b3}, c_{b3} \end{matrix}}_{S1} \quad (2)$$

$$\underbrace{\begin{matrix} \text{Spot color 1: } L_1, a_1, b_1 \\ \text{Spot color 2: } L_2, a_2, b_2 \\ \text{Spot color 3: } L_3, a_3, b_3 \end{matrix}}_{S2}$$

As shown in a region S1 of the equation (2), a parameter $R_{para}$ which is a feature quantity of the R value obtained from the envelope $L_r$ of the R value histogram is defined as coefficients $a_{r1}$, $b_{r1}$, $c_{r1}$, $a_{r2}$, $b_{r2}$, $c_{r2}$, $a_{r3}$, $b_{r3}$ and $c_{r3}$. Similarly, a parameter $G_{para}$ which is a feature quantity of the G value obtained from the envelop $L_g$ of the G value histogram is defined as coefficients $a_{g1}$, $b_{g1}$, $c_{g1}$, $a_{g2}$, $b_{g2}$, $c_{g2}$, $a_{g3}$, $b_{g3}$ and $c_{g3}$. Also, a parameter $B_{para}$ which is a feature quantity of the B value obtained from the envelop $L_b$ of the B value histogram is defined as coefficients $a_{b1}$, $b_{b1}$, $c_{b1}$, $a_{b2}$, $b_{b2}$, $c_{b2}$, $a_{b3}$, $b_{b3}$ and $c_{b3}$.

Figure 3:
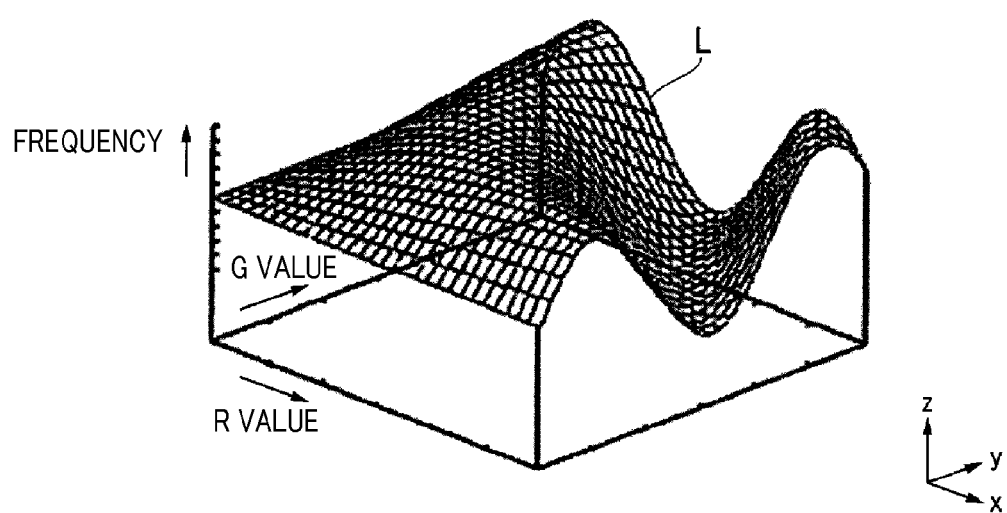
FIG. 3 is a diagram showing an approximation of an envelope surface of, for example, a histogram of a combination of R-value and G-value in an RGB value.

FIG. 3 is a diagram showing approximation of an envelope surface of the histogram for a combination of, for example, the R value and the G value of the RGB values. FIG. 3 shows a three-dimensional histogram in which the X axis shows a R value gradation level (256 gradation from 0 to 255) and the Y-axis shows a G value gradation level and the Z axis shows the number of pixels where the R value gradation level and the G value gradation level are combined. In other words, FIG. 3 illustrates a histogram showing the number of pixels present in the whole image, corresponding to the respective combinations in the gradation levels of the R value and the G value (256×256=65536 combinations in the case where the R value and the G value each have 256 gradation levels).

As for the envelope surface $L_{rg}$ shown in FIG. 3, the curved surface is approximated, similar to that of FIG. 2, combining a plurality of functions such as quadratic, cubic or special functions. The coefficients in the approximation are determined as the parameters of the image feature quantity. Coefficients of functions are similarly determined as an image feature quantity, where the functions are used for approximating the envelope surface $L_{gb}$ of a histogram of a G-B value combination of the RGB values and the envelope surface $L_{rb}$ of an R-B value combination. Further, all of coefficients in the functions may be used as parameters of the image feature quantity, where the functions approximates the envelope surface $L_{rg}$ of the R-G value combination histogram, the envelope surface $L_{gb}$ of the G-B value combination histogram and the envelope surface $L_{rb}$ of the R-B value combination histogram.

Moreover, coefficients of functions that approximate the envelop surface of a histogram showing the number of pixels for every combination of the RGB values may be employed as a feature quantity (not shown). Assuming a histogram is made for each of the R value, the G value and the B value, when a histogram is made based an image whose the RGB values of the coordinates are different, a similarly shaped envelope may be produced. However, in the RGB values, when combinations of the R and G values, the G and B values, and the R and B values are used, the color information of the pixels can be included accurately in the image feature quantity.

Referring back to FIG. 1, the image information extracting unit 12 converts information about the pixels in an image such as the reference image or the print image, into the RGB value. Then, while changing the coefficients of the plurality of functions, as shown in FIG. 2, expressed by the equation (1), the image information extracting unit 12 calculates, for every function, coefficients which can achieve an approximated shape of an envelope when the plurality of functions are combined. The image information extracting unit 12 determines coefficients of functions when a curved line as a result of combining the plurality of functions fits the envelope, as an image feature quantity of an image (print image or reference image).

The estimation color extracting unit 13 detects, based on the correlation model which is described later, respective numerical values (L, a, b) of the colorimetric value L*a*b* for every ink in a combination of the ink-colors corresponding to the image feature quantity of the print image, as shown in the equation (2). The correlation model where the process of the equation (2) is performed represents a relation between the image feature quantity and the colorimetric values L*a*b* corresponding to the image feature quantity. The correlation model outputs an ink-color set in response to an input of the image feature quantity, where the ink-color set is a combination of the colorimetric values L*a*b* of the ink used when reproducing an image, during printing, corresponding to the accepted image feature quantity.

Here, "reproducing an image" refers to reproduction of the colorimetric values of the pixels in the print image. As described above, according to the present embodiment, a neural network model is employed as an example of the correlation model. Specifically, the estimation color extracting unit 13 provides the image feature quantity of the print image to the correlation model, and extracts the ink-color set of the colorimetric values L*a*b* which is outputted by the correlation model in response to the accepted image feature quantity of the print image, as an ink-color set which is a combination of an ink-colors (solid colorimetric values L*a*b*) used for printing of the print image. The colors of the inks in the extracted ink-color set refers to the solid colorimetric values L*a*b*.

Figures 4, 5:
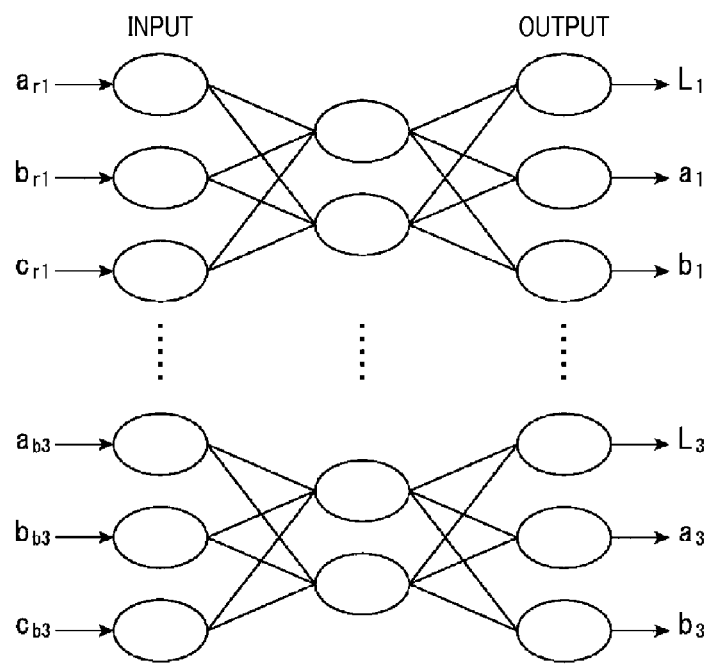
FIG. 4 is a diagram showing a concept of a correlation model using a neural network model stored in a correlation database 22.
FIG. 5 is a diagram showing a configuration example of a spot color profile table stored in a spot color profile database 23.

FIG. 4 is a diagram showing a concept of the correlation model using a neural network model stored in the correlation database 22. The inputs are 27 image feature quantities of $R_{para}$, $G_{para}$ and $B_{para}$ in the equation (2). On the other hand, the outputs are combinations of numerical values (L, a, b) of the colorimetric values L*a*b* as ink-color sets used when printing print image.

The correlation model accepts the image feature quantity of a print image, whereby a combination of the ink-color corresponding to the image feature quantity, i.e., an ink-color set suitable for printing the print image can be obtained, based on a correlation represented by a ratio of synaptic connections or the like obtained by machine learning. As shown in FIG. 4, an artificial neuron in which the network is formed by the synaptic connections changes the synaptic strength by machine learning, thereby forming the above-described correlation model.

The correlation model which is generated by the machine learning based on this learning is stored in the correlation database 22.

Referring back to FIG. 1, the spot color profile generation unit 14 controls, using the ink-color set extracted by the estimation color extracting unit 13, the color estimation system 18 to generate a spot color profile table corresponding to the ink-color set to be used for the print image. The table is generated to calculate a dot area ratio (e.g., dot area ratio of primary color inks such as C, M, Y and the dot area ratio of the spot color ink which is described later) of each colored ink for obtaining the colorimetric values L*a*b* corresponding to the gradation of each of the pixels. Thus, the color estimation system 18 generates the spot color profile table showing a correlation of combinations of the dot area ratios of the inks with the colorimetric values L*a*b* to be reproduced by the respective combinations, using a known ICC profile format. A method for generating the spot color profile table in the color estimation system 18 will be described in more detail in describing the color estimation system 18.

The spot color profile generation unit 14 stores the spot color profile table generated by the color estimation system 18 into the spot color profile database 23, so as to be correlated to the print image.

FIG. 5 is a diagram showing a configuration example of a spot color profile table stored in the spot color profile database 23. The spot color profile table is provided for every print image, storing values L, a, b, a dot area ratio of an ink color 1, a dot area ratio of an ink color 2, a dot area ratio of an ink color 3 and so on, being correlated to each other. The values L, a, b are numerical values of the colorimetric values L*a*b*, respectively, corresponding to an RGB values. The dot area ratios such as the dot area ratios of ink colors 1, 2, 3 so on show a set of color-specific dot area ratios of the inks in the ink-color set to reproduce the colorimetric values when printed. Referring to the spot color profile table, the dot area ratio of each ink in the ink-color set, which is necessary to reproduce the colorimetric values L*a*b*, can be obtained.

Referring back to FIG. 1, the colorimetric value dot area ratio conversion unit 15 successively extracts a combination of the dot area ratios (separation of the color to be printed) of respective colors corresponding to the colorimetric values of each of the pixels in the print image.

The separation data generation unit 16 generates separation data of the print image, on the basis of the dot area ratios of the pixels of each ink color obtained in the conversion unit 15. The separation data generation unit 16 stores the generated separation data set into an image database 24, so as to be correlated to print image identification information of the print image. The print image identification information refers to identification information to identify the print image.

The reference image generation unit 17 reads the ink-color corresponding to respective separation data that have been used when printing a reference image, from a reference image separation data table provided for every reference image stored in the table database 21. The reference image separation data table includes colorimetric values (solid colorimetric value) which are the ink-colors for every separation data. Thus, the reference image generation unit 17 obtains the colorimetric values of the ink-colors which are necessary for printing the reference image. The separation data used for printing the reference image is generated for each ink-color in the ink color set.

FIG. 6 is a diagram showing a configuration example of a reference image separation data table stored in the table database 21. The reference image separation data table is provided for every reference image. As shown in FIG. 6, the reference image separation data table stores the separation data identification information, being correlated to ink-colors. The separation data identification information is used for identifying the separation data. The ink colors refer to the colorimetric values L*a*b* of the inks used for the separation data. To print a reference image, a plurality of separation data are used, and the ink color used for the printing is provided for each separation data. Since the separation data to print the reference image has already been generated, the ink colors (solid colorimetric values L*a*b*) for printing the reference image are known data. In other words, the ink colors (solid colorimetric values) used for printing the reference image are already known.

The reference image generation unit 17 supplies a combination of the ink colors (solid colorimetric values) in the ink-color set to the color estimation system 18, makes the color estimation system 18 estimate print colors by the combination of the dot area ratios of the ink color (solid colorimetric values) and generates a reference image spot color profile table which is a spot color profile table of the reference image. The reference image spot color profile table is provided for every reference image.

The reference image generation unit 17 extracts the dot area ratios for every pixel, from the separation data corresponding to the colors of the inks in the ink-color set. The reference image generation unit 17 refers to the reference image spot color profile table so as to calculate, for every pixel, the colorimetric values corresponding to the combination of the dot area ratios of the inks in the ink-color set.

The color estimation system 18 performs an estimation process of print colors using a combination of the ink colors (combination of solid colorimetric values L*a*b*) in the ink-color set used for printing the image (print image, reference image), when the spot color profile generation unit 14 and the reference image generation unit 17 require estimation of print colors and generation of the spot color profile table. The color estimation system 18 is supplied with the ink set used for printing the image (print image and reference image), thereby generating the spot color profile table (reference image spot color profile table) showing correlation of the colorimetric values L*a*b* which are the colors of the coordinates in the L*a*b* space, with combinations of the dot area ratios of inks in the ink-color set. Then, the color estimation system 18 supplies the generated spot color profile table to the spot color profile generation unit 14 and the reference image generation unit 17.

FIG. 7 is a diagram showing a configuration example of a reference image spot color profile table stored in the spot color profile database 23. The reference image spot color profile table includes color-specific combinations of the dot area ratios, i.e., dot area ratios of ink colors 1, 2, 3 and so on, being correlated to the colorimetric values L*a*b* corresponding to the combinations of the dot area ratios. It should be noted that the ink colors 1, 2, 3 and so on are the primary color inks (e.g., C, M, Y) or the spot color inks (e.g., mixed inks made of C, M, and Y, such as C+M, C+Y, M+Y and C+M+Y), for example.

Referring back to FIG. 1, the reference image generation unit 17 calculates a combination of the dot area ratios of the inks in each of the pixels of the reference image, from each of the separation data used for printing the reference image of the image database 24. The reference image generation unit 17 refers to the reference image spot color profile table, and reads the colorimetric values L*a*b* corresponding to the combination of the dot area ratios of the inks, thereby acquiring the colorimetric values L*a*b* of the pixels. Moreover, the reference image generation unit 17 correlates the acquired colorimetric value L*a*b* reproduced by the dot area ratios of the inks in the ink-color set of each of the pixels, with the pixel coordinates of each of the pixels in the reference image. Then, the reference image generation unit 17 stores the colorimetric values L*a*b* into the reference image information extracting data table.

FIG. 8 is a diagram showing a configuration example of a reference image information extracting data table stored in the table database 21. The reference image information extracting data table is provided for every reference image. In the reference image information extracting data table, pixel coordinates, dot area ratios of ink colors 1, 2, 3 and so on, (L, a, b) showing L*a*b* which are a colorimetric values, RGB values corresponding to the colorimetric values (R, G and B values as R-, G- and B-gradations, respectively) are provided, being correlated to each other. The pixel coordinates represent coordinates of each of the pixels in the reference image. The dot area ratios of a ink colors 1, 2, 3 or the like are a combination of the dot area ratios of the inks in the ink-color set to reproduce the colorimetric value (L*a*b* value) of the pixels in the corresponding pixel coordinate.

Referring back to FIG. 1, the image information extracting unit 12 refers to the reference image information extracting data table of the table database 21 and extracts the reference image feature quantity of the reference image. For example, the image information extracting unit 12 converts L*a*b* values which are colorimetric values of each of the pixels in the reference image to the RGB values, approximates the envelopes of the histograms corresponding to R, G, B values by using a plurality of functions (e.g., equation (1)) as already described in the process of extracting an image feature of a print image, and extracts coefficients in the respective functions as the reference image feature quantity (e.g., as 27 parameters as similar to those of a print image).

The image information extracting unit 12 stores reference image index, ink color set and a reference image feature quantities, into the reference image set data table in the table database 21, being correlated to the identification information of reference image.

FIG. 9 is a diagram showing a configuration example of a reference image set data table stored in the table database 21. In the reference image set data table, reference image indexes, an ink-color sets and reference image feature quantities are stored, being correlated to the identification information of reference images. The reference image identification information identifies a reference image. A reference image index represents an address data where image data of the reference image corresponding to the reference image identification information in the image database 24 is written. As described above, the ink-color set is a combination of ink colors (solid colorimetric values L*a*b*) used for the printing of the reference image identified by the reference image identification information. Reference image feature quantities are image feature quantities (e.g., $R_{para}$, $G_{para}$, $B_{para}$) extracted by the image information extracting unit 12. The learning unit 19 stores, in advance, image indexes which are addresses pointing areas of the image database 24 storing the separation data of reference images, reference image feature quantities and ink-color sets used for printing the reference images, into the correlation table in the correlation database 22. These data are correlated to the reference image identification information of the reference images used as learning data during machine learning.

Referring back to FIG. 1, the learning unit 19 refers to the reference image set data table of the table database 21 and generates, by machine learning, a correlation model (e.g., neural network model) representing correlation between the image feature quantity and the ink-color set. Since generation of this correlation model by machine learning is based on a generally used technique such as a neural network model, a regression model and a multivariate regression model, detailed explanation is omitted.

For example, when generating the correlation model as a neural network model, as described referring to FIG. 4, the learning unit 19 controls the correlation model to receive the reference image quantity (e.g., 27 parameters of $R_{para}$, $G_{para}$, $B_{para}$) of the reference image, performs machine learning such that the ink-color set (combination of solid colorimetric values $L^*a^*b^*$ of the ink-colors used for printing the reference image) is outputted, and adjusts a ratio of the synaptic connections or the like so as to generate the correlation model. The correlation model is generated in this way so as to have a function of obtaining an ink-color set corresponding to an image feature quantity of a desired image, that is, an ink-color set suitable for reproducing the colorimetric values $L^*a^*b^*$ of the pixels when printing the print image. The correlation model is formed in a state where an artificial neuron forming a network by the synaptic connections shown in FIG. 4, changes the connection strength of the synapsis by machine learning.

Also, the learning unit 19 stores the generated correlation models into the correlation database 22.

In the explanation set forth above, to produce the image feature quantity, the colorimetric value $L^*a^*b^*$ of the pixels in an image are converted to RGB values, histograms are defined in respect of the number of pixels corresponding to the gradation levels of the R, G and B values, and the image feature quantity is determined as the coefficients of the functions that approximates the envelope of the histograms. However, the image feature quantity is not limited thereto. For example, the pixels in the image (reference image or print image) are resampled sparsely to form a thumbnail image, and then RGB values or the colorimetric values $L^*a^*b^*$ of the pixels in the thumbnail image may be used for machine learning as input parameters corresponding to an image feature quantity of the correlation model. The output of the correlation model is the above-described ink-color set.

As other image feature quantities, for example, the pixels in the image (print image, reference image) are grouped by similar colors, into a predetermined number of groups, so as to form group regions. The number of pixels (surface area) of a group region of each color and a representative color in the group region are determined. As an input of the correlation model, RGB values of the representative color or colorimetric values $L^*a^*b^*$ may be used as a image feature quantity, and machine learning may be performed so as to obtain a ink-color set used for, as an output, for printing the image. In this case, the representative color and the number of pixels (surface area) of the group region may be combined for use as an image feature quantity. Further, the representative color of the group region may be determined as an average value calculated from the RGB values or the colorimetric values $L^*a^*b^*$ of the pixels in the group region. Also, the representative color of each group region may be an intermediate value between the largest numeric value and the smallest numeric value of the RGB values or the colorimetric values $L^*a^*b^*$ of the pixels.

Figure 10:
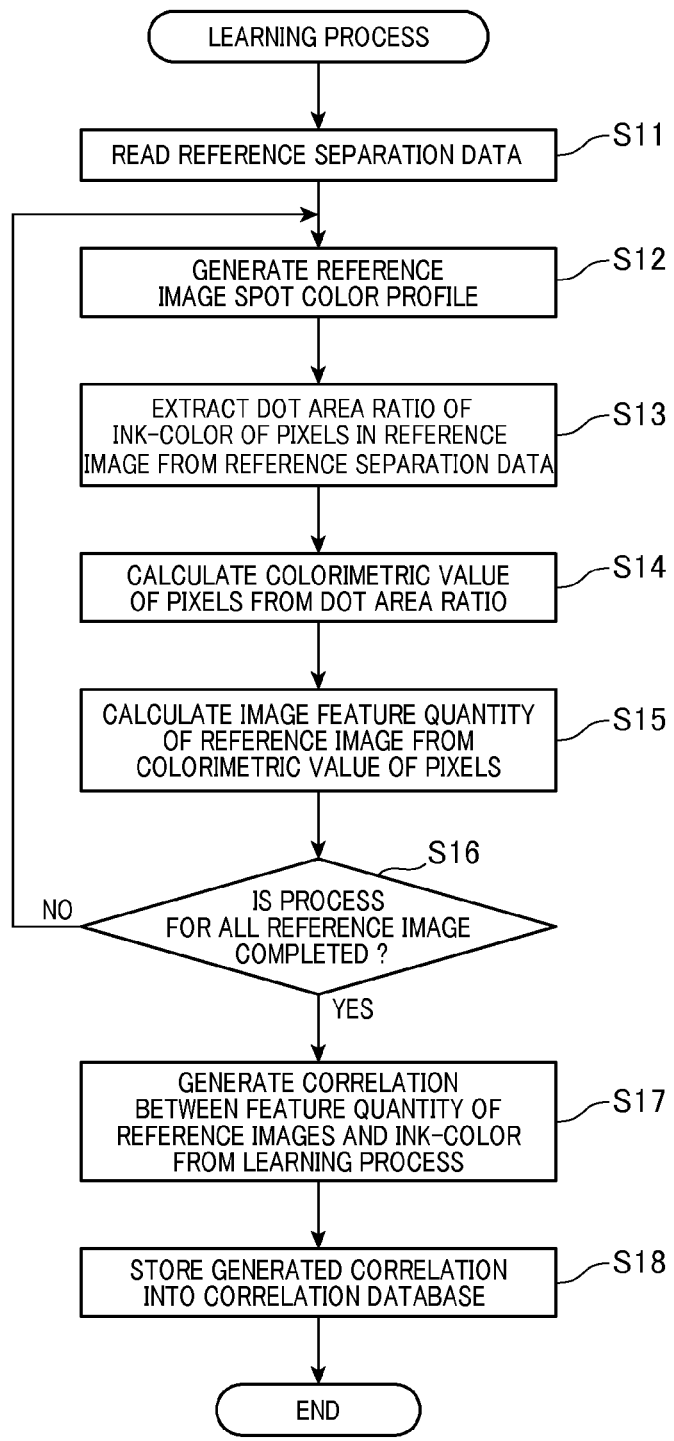
FIG. 10 is a flowchart showing an operation example of a generation process of a correlation model using a reference image.

FIG. 10 is a flowchart showing an operation example of a generation process of a correlation model using reference images. In step S11, the user sequentially inputs, into the color estimation system 1, a plurality of pieces of image data of a reference image (separation data set as a combination of separation data) as learning data used to generate the correlation model.

The input unit 11 adds identification information to the reference image and the reference separation data, and stores the separation data set which the user has inputted to the system, into the image database 24. At this time, the input unit 11 stores a reference image index which is an address pointing an area of the image database 24 storing the image data of the reference image, and an ink-color set corresponding to the reference separation data, into the reference image set data table in the table database 21. Moreover, the input unit 11 stores the colorimetric values $L^*a^*b^*$ representing the ink colors used for the reference separation data, for every piece of separation data identification information which identifies the reference separation data, into the reference image separation data table of the table database 21.

In step S21, the reference image generation unit 17 refers to the reference image set data table of the table database 21, and reads reference image identification information in the order of description in the reference image set data table. Then, the reference image generation unit 17 refers to the reference image separation data table corresponding to the read reference image identification information, and reads the separation data identification information and the ink-color set (combination of the colorimetric values of the inks in the ink-color set) onto the reference image separation data table.

The reference image generation unit 17 adds the ink-color set to a request for generating a reference image spot color profile, and outputs the request to the color estimation system 18.

Thus, the color estimation system 18 estimates the print color when printing is performed with a combination of the dot area ratios of the inks based on the colorimetric values in the ink-color set, for every coordinate in the color space expressed by $L^*a^*b^*$, which will be detailed later in the description of the color estimation system 18.

The color estimation system 18 generates a reference image spot color profile and outputs the profile to the reference image generation unit 17. The reference image spot color profile shows correlation between a combination of the dot area ratios of the inks (dot area ratios of ink colors 1, 2, 3 and so on) and the colorimetric values $L^*a^*b^*$ when printing is performed with this combination.

The reference image generation unit 17 stores the reference image spot color profile table which is supplied from the color estimation system 18, into the table database 21, with the addition of the reference image identification information.

In step S13, the reference image generation unit 17 refers to the reference image set data table of the table database 21, and reads the reference image index corresponding to the reference image identification information of the reference image to be processed. The reference image generation unit 17 extracts, based on the read reference image index, the dot area ratios of the inks for each of the pixels, from each of the reference separation data of the reference image in the image database 24.

Then, the reference image generation unit 17 correlates the extracted dot area ratios of the inks with the pixel coordinates of the pixels, and stores the extracted dot area ratios into the reference image information extracting data table of the table database 21, for every color of the inks (ink-color) corresponding to the reference separation data. The reference image generation unit 17 extracts the dot area ratios of the inks from the above-described reference separation data, for all the pixels in the reference image.

In step S14, the reference image generation unit 17 acquires a numeric values of the colorimetric values L*a*b* corresponding to the combination of the dot area ratios of the inks (dot area ratios of ink colors 1, 2, 3 and so on), in the order of the pixel coordinates of the reference image information extracting data table of the table database 21, using the reference image spot color profile table.

Then, the reference image generation unit 17 stores the numeric values of the colorimetric values L*a*b* acquired in the order of pixel coordinates, into the fields of colorimetric values L*a*b* in the reference image information extracting data table of the table database 21.

The reference image generation unit 17 performs the above-described process in respect of all the pixels of the reference image (i.e., pixel coordinates), to convert a combination of dot area ratios of inks in each of the pixel coordinates into the numeric values of the colorimetric values L*a*b*.

In step S15, the image information extracting unit 12 converts, in the order of pixel coordinates, the numeric values of the colorimetric values L*a*b* into the RGB values in the reference image extracting data table of the table database 21. Then, the image information extracting unit 12 stores the converted RGB values (R value as R-gradation, G value as G-gradation, B value as B-gradation) into the reference image extracting data table of the table database 21, so as to be correlated to the colorimetric values L*a*b*.

The image information extracting unit 12 performs the above-described process in respect of all the pixels of the reference image (i.e., pixel coordinates) to convert the numeric values of the colorimetric values L*a*b* into the RGB values.

Next, the image information extracting unit 12 counts, for all the pixels of the reference image, the number of pixels of each gradation level of the R value so as to generate a histogram shown in FIG. 2 indicating the number of pixels of each gradation level. Next, the image information extracting unit 12 generates an envelope of the acquired histogram. The image information extracting unit 12 uses two or more functions (e.g., 3 functions) expressed in the equation (1) to synthesize, as shown in FIG. 2, curves $L_{r1}$, $L_{r2}$ and $L_{r3}$ formed corresponding to three functions so as to approximate the envelope $L_r$ of the histogram. Here, the image information extracting unit 12 extracts, as the reference image feature quantity $R_{para}$ the coefficients of the functions when a synthesized curve of the curves $L_{r1}$, $L_{r2}$ and $L_{r3}$ fits the envelope $L_r$ of the histogram.

Similarly to the above-described process for the R value, the image information extracting unit 12 performs an approximation process of the envelope for the histograms of the G and B values, so as to extract the reference image feature quantities $G_{para}$ and $B_{para}$. The image information extracting unit 12 stores the extracted reference image feature quantities ($R_{para}$, $G_{para}$, $B_{para}$) into reference image feature quantity fields of the reference image set table in the table database 21, so as to be correlated to the reference image.

In step S16, the image information extracting unit 12 refers to the reference image set data table of the table database 21 and determines whether or not the reference image feature quantities have been extracted for all reference images.

At this time, the image information extracting unit 12 advances the process to step S17, when the extraction of the reference image feature quantities has been completed for all reference images. On the other hand, the image information extracting unit 12 returns the process to step S12, when the extraction of the reference image feature quantities has not been completed for all reference images.

In step S17, the learning unit 19 generates a correlation model which accepts an input of an image feature quantity and outputs an ink-color set used for printing an image. To generate this correlation model, the learning unit 19 uses, as learning data, correlation between reference image feature quantities of reference images in the reference image set data table and ink-color sets (combinations of solid colorimetric values in color-inks). As shown in FIG. 4, for example, the learning unit 19 controls the correlation model to accept a reference image feature quantity (e.g., $R_{para}$, $G_{para}$, $B_{para}$) of a reference image and performs machine learning so as to output an ink-color set corresponding to the accepted reference image (combination of solid colorimetric values of the ink colors used for printing the reference image), whereby the correlation model is generated with adjustment such as of a ratio of synaptic connections between the artificial neurons.

In step S18, the learning unit 19 stores the generated correlation model into the correlation database 22.

Figure 11:
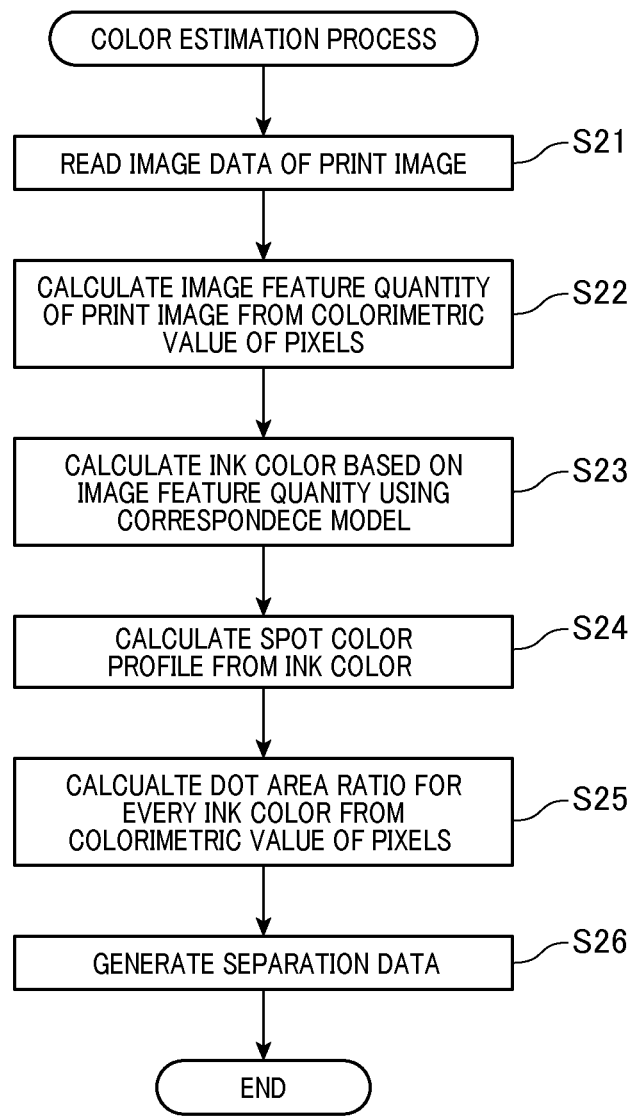
FIG. 11 is a flowchart showing an operation example of a generation process of a separation data of a print image using a correlation model.

FIG. 11 is a flowchart showing an operation example of a generation process of a separation data of a print image using the correlation model.

In step S21, the user inputs image data of a print image, for example, the colorimetric values L*a*b* of each of pixels in the print image acquired by a color scanner, to the color estimation system 1 via an input means. The input unit 11 stores the image data of the print image to the image database 24.

In step S22, the image information extracting unit 12 refers to the image data of the print image stored in the image database 24, and converts the numeric value of the colorimetric values L*a*b* in the image data of the print image into the RGB values for each pixel. The image information extracting unit 12 performs the conversion process for all of the pixels.

Next, the image information extracting unit 12 counts, in respect of all the pixels of the print image, the number of pixels of each of gradation levels of the R value, so as to generate a histogram shown in FIG. 2 indicating the number of pixels for each gradation level. Next, the image information extracting unit 12 generates an envelope of the acquired histogram. Similar to the process for reference image feature quantity on the basis of the image data of a reference image, the image information extracting unit 12 uses two or more functions (e.g., 3 functions) expressed in the equation (1) to synthesize, as shown in FIG. 2, the curves $L_{r1}$, $L_{r2}$ and $L_{r3}$ formed corresponding to three functions so as to approximate the envelope $L_r$ of the histogram. Here, the image information extracting unit 12 extracts, as the image feature quantity $R_{para}$, the coefficients of the functions when a synthesized curve of the curves $L_{r1}$, $L_{r2}$ and $L_{r3}$ fits the envelope $L_r$ of the histogram.

Similarly to the above-described process for the R value, the image information extracting unit 12 performs an approximation of the envelope in the histogram for both the G value and the B value, so as to extract the image feature quantities $G_{para}$ and $B_{para}$. As described, the image information extracting unit 12 extracts the image feature quantity ($R_{para}$, $G_{para}$, $B_{para}$) from the image data of the print image. Then, the image information extracting unit 12 outputs the extracted image feature quantity to the estimation color extracting unit 13.

In step S23, next, the estimation color extracting unit 13 reads the correlation model generated by the learning unit 19 from the correlation database 22, when the image information extracting unit 12 supplies an image feature quantity ($R_{para}$, $G_{para}$, $B_{para}$) to the estimation color extracting unit 13. Then, the estimation color extracting unit 13 inputs the supplied image feature quantity ($R_{para}$, $G_{para}$, $B_{para}$) to the correlation model (e.g., neural network model shown in FIG. 4), and as expressed in the equation (2), the estimation color extracting unit 13 acquires the ink-color set (combination of solid colorimetric values L*a*b*) used for printing the print image, as an output of the correlation model.

According to the above-described process, the estimation color extracting unit 13 acquires the ink-color set (solid colorimetric values of inks) used for printing the print image. Then, the estimation color extracting unit 13 outputs the acquired ink-color set to the spot color profile generation unit 14.

In step S24, the spot color profile generation unit 14 adds the ink-color set supplied from the estimation color extracting unit 13 to a request for generating the spot color profile, and outputs the data including the ink-color set to the color estimation system 18. Thus, the color estimation system 18 estimates the print color in the L*a*b* color space when the print image is printed with a combination of the dot area ratios of the inks. This estimation process will be described in detail in the description of the color estimation system 18.

The color estimation system 18 generates a spot color profile representing correspondence between a combination of the dot area ratios of the inks (dot area ratios of ink colors 1, 2, 3 and so on) in the estimated ink-color set and the colorimetric values L*a*b*, and outputs the generated spot color profile to the spot color profile generation unit 14. The spot color profile generation unit 14 stores the spot color profile table supplied from the color estimation system 18 into the table database 21.

In step 25, the colorimetric value dot area ratio conversion unit 15 sequentially reads the numeric values of the colorimetric values L*a*b* of the pixels of the image data of the print image, and convert the colorimetric value into combinations of the dot area ratios of the inks (dot area ratio of an ink color 1, dot area ratio of an ink color 2, dot area ratio of an ink color 3 and so on), using the spot color profile table in the table database 21. Here, the colorimetric value dot area ratio conversion unit 15 performs the conversion in which the above-described numerical values of the colorimetric values L*a*b* are converted to combinations of dot area ratios of the respective inks, for all the pixels (i.e., pixel coordinates) of the print image.

In step S26, the separation data generation unit 16 uses the dot area ratios of the inks of the pixels of the print image obtained in the colorimetric value dot area ratio conversion unit 15, and generates separation data for inks in the ink-color set used for printing the print image.

The plate data generation unit 16 stores, being correlated to the print image, a set of generated separation data used for printing the print image into the image database 24, adding print image identification information that identifies the print image.

Conventionally, a printing process has been performed by an operator, relying on human senses to select an appropriate ink-color set used for printing a print image. According to the present embodiment, in selecting an appropriate ink-color: the separation data for printing is prepared in advance; a reference image is used, whose ink-color set for reproducing the image in printing is known in advance; and a correlation model is produced by machine learning, the model showing a correlation between an image feature quantity of the image and an ink-color set to be used for printing an image having the image feature quantity. Owing to this correlation model, what is only required is to provide an image feature quantity of a print image to be printed.

Therefore, a process for selecting an appropriate ink-color set can be accomplished regardless of a difference in the level of skill between operators. Further, the separation data corresponding to the ink-color set can be simply produced, thereby reducing the manufacturing steps of producing the separation data.

Hereinafter, the color estimation system 18 will be described.

According to the present embodiment, in gravure printing, screen printing, offset printing or the like, when printing an ink on a print medium, dots corresponding to a command dot area ratio showing a gradation are formed on a surface of the print medium. For the dots in the gravure printing, depending on the command dot area ratio, an area where the ink is printed on the surface of the print medium (area modulation gradation expression) and a thickness of the ink to be printed (density modulation gradation expression) are varied. For example, figuratively speaking, the dots formed in gravure printing can be similar to a structure of a mountain in that the larger the mountain is, the wider the plains become, and the higher the altitude of the mountain becomes. Compared to such a large mountain, the smaller the mountain is, the narrower the plains become, and the lower the altitude becomes. In other words, dots during printing change not only in the area in which an ink is printed, but also in the thickness thereof, depending on the command dot area ratio.

Therefore, in the present embodiments, a calculation model (core-fringe model described later) is used for modeling a structure of each dot formed in printing. In this calculation model, the area of a dot on a surface of a print medium to which an ink is printed and the thickness of the ink in a dot to be printed are expressed according to a command dot area ratio. In performing color prediction for each gradient of a primary color or a spot color printed onto a print medium (e.g., paper), the present embodiments use a calculation model that models a shape of a dot in each gradient. The dot in the model is generated at a command dot area ratio and formed of a plurality of density gradation areas (similar to the configuration of a contour).

Figure 12:
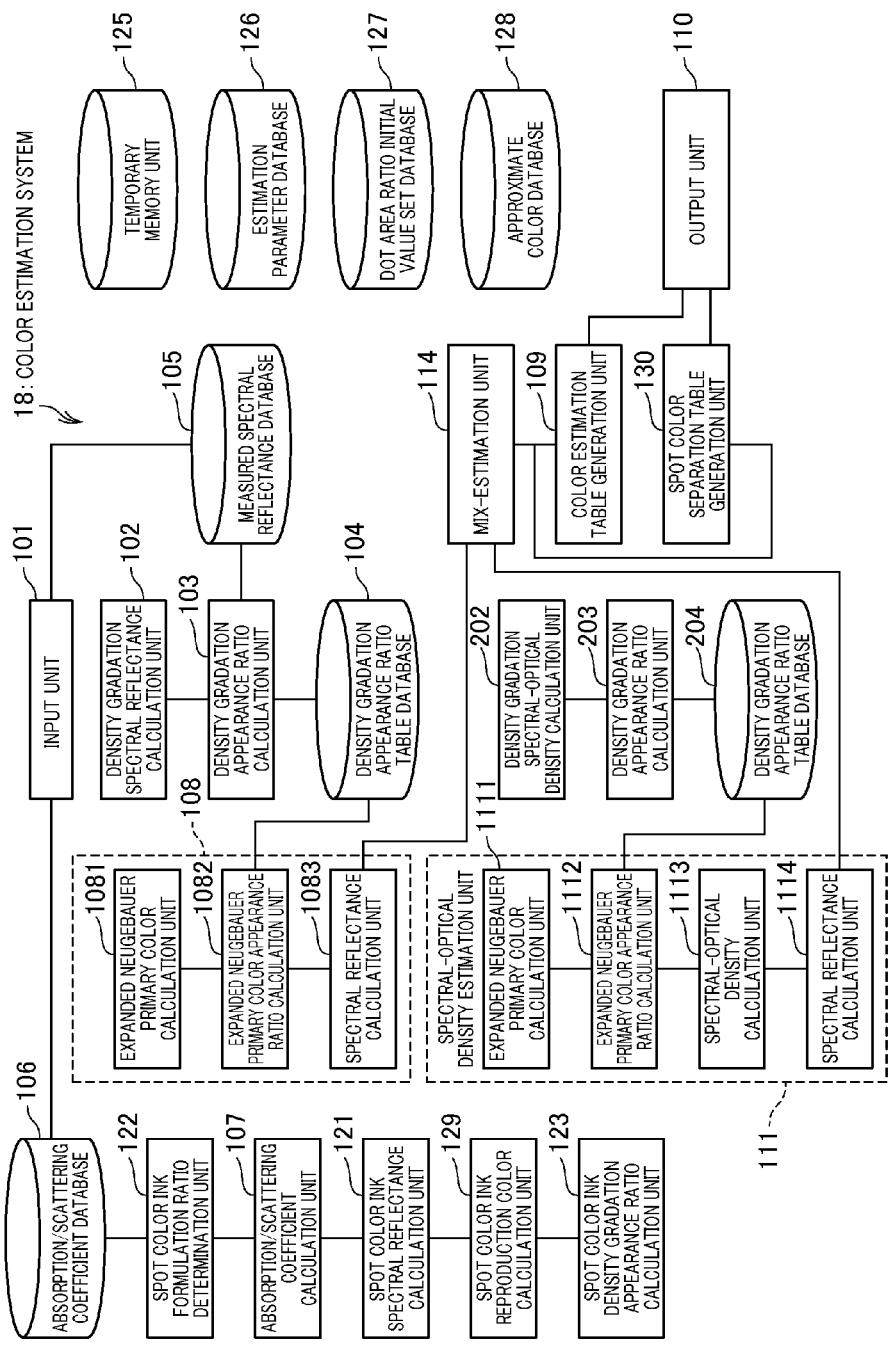
FIG. 12 is a block diagram showing a configuration example of a color estimation system 18 according to the present embodiment.

With reference to the drawings, a color estimation system 18 used for the color estimation system of the present embodiment will be described. FIG. 12 is a block diagram showing a configuration example of the color estimation system 18 according to the present embodiment. In FIG. 12, the color estimation system 18 is provided with an input unit 101, a density gradation spectral reflectance calculation unit 102, a density gradation appearance ratio calculation unit 103, a density gradation appearance ratio table database 104, a measured spectral reflectance database 105, an absorption/ scattering coefficient database 106, an absorption/scattering coefficient calculation unit 107, a spectral reflectance estimation unit 108, a color estimation table generation unit 109, an output unit 110, a spectral-optical density estimation unit 111, a mix-estimation unit 114, a spot color ink spectral reflectance calculation unit 121, a spot color ink formulation ratio determination unit 122, a spot color ink density gradation appearance ratio calculation unit 123, a temporary memory unit 125, an estimation parameter database 126, a dot area ratio initial value set database 127, an approximate color database 128, a spot color ink reproduction color calculation unit 129, a spot color separation table generation unit 130, a density gradation spectral-optical density calculation unit 202, a density gradation appearance ratio calculation unit 203, and a density gradation appearance ratio table database 204.

The input unit 101 is, for example, connected to an external computer, accepting data such as specified value of a command dot area ratio for the primary color inks or the spot color inks which are set by the user. Also, the input unit 101 may include an input means such as a keyboard or a touch panel, and output the data such as a specified value of the command dot area ratio for each ink being set by the user, to each part in the color estimation system 18.

The absorption/scattering coefficient database 106 stores, for each primary color ink, a scattering coefficient $S(\lambda)$ and an absorption coefficient $K(\lambda)$ of a colored layer of the ink, the coefficients being written in advance such as by the external computer. These coefficients are calculated from a printed portion of the ink printed at a command dot area ratio of 100%, i.e. solidly printed, on a print medium (e.g., paper, such as coated paper). In calculating the scattering coefficient $S(\lambda)$ and the absorption coefficient $K(\lambda)$, each primary ink is solidly printed on a white print medium and a black print medium to prepare the respective print portions.

Then, a spectral reflectance is measured for a color layer of the ink solidly printed on a surface of each of the white and black print media. The spectral reflectance in a print portion on the surface of the white print medium is referred to as a white-measured spectral reflectance, and the spectral reflectance in a print portion on the surface of the black print medium is referred to as a black-measured spectral reflectance.

Based on the white- and black-measured spectral reflectance, the scattering coefficient $S(\lambda)$ and the absorption coefficient $K(\lambda)$ are calculated. The scattering coefficient $S(\lambda)$ and the absorption coefficient $K(\lambda)$ are calculated with a plurality of wavelengths $\lambda$ in a predetermined wavelength range.

The approximate color database 128, stores in advance, a colorimetric value and a formulation ratio of primary colors, in respect of each of a plurality of spot color inks (reference spot color inks) each having a different combination of primary color inks as formulated.

The measured spectral reflectance database 105 stores in advance, for each primary color ink, measured spectral reflectances $R_s(\lambda)$ of print portions on a print medium, in which the primary color ink is printed at a plurality of command dot area ratios. The reflectances $R_s(\lambda)$ are written in advance into the database 105 by the external computer or the like. For example, the print portions are provided in the form of a step chart resulting from printing m-step command dot area ratios. In obtaining the measured spectral reflectances $R_s(\lambda)$, dots of a plurality of command dot area ratios are printed using a primary color ink onto a print medium to be actually used. The symbol "s" herein represents a command dot area ratio. Then, the spectral reflectances of the print medium are measured for each print portion having dots at a command dot area ratio. Further, the measured spectral reflectance database 105 stores in advance a ground spectral reflectance $R_0(\lambda)$ of a print medium actually used for printing, similar to the measured spectral reflectances $R_s(\lambda)$. The ground spectral reflectance $R_0(\lambda)$ is written in advance such as by the external computer.

The temporary memory unit 125 is a memory unit used for storing a temporal calculation result of the respective units of the present embodiment during the calculation, storing a scattering/absorption coefficient table, a spot color ink formulation ratio table, a spot color ink density gradation appearance ratio table, a Neugebauer primary color table, a spectral reflectance table, a color estimation table, a spot color separation table or the like.

The estimation parameter database 126 of the present embodiment stores weighting coefficients w, which will be described later, to be used in the mix-estimation unit 114. Weighting coefficient w is calculated by printing data as a training data, and minimizing an error between a spectral reflectance obtained from a model prepared by the weighting coefficient and a spectral reflectance of the printed data. When the Yule-Nielsen correction Neugebauer model is used as a spectral reflectance estimation model for a printed color, an n value may be set.

The dot area ratio initial value set database 127 receives and stores in advance initial values of command dot area ratio to be used by the spot color separation table 130, for each number of colors of spot color inks to be used.

Hereinafter, a calculation of density gradation appearance ratio using a spectral reflectance will be described.

The density gradation spectral reflectance calculation unit 102 reads an absorption coefficient $K(\lambda)$ and a scattering coefficient $S(\lambda)$ from the absorption/scattering coefficient database 106, according to the kind of the primary color ink supplied from the input unit 101. Further, the density gradation spectral reflectance calculation unit 102 reads measured spectral reflectances $R_s(\lambda)$ of the respective command dot area ratios, and a ground spectral reflectance ratio $R_0(\lambda)$ from the measured spectral reflectance database 105, according to the kind of the primary color ink and the kind of print medium supplied from the input unit 101.

Then, the density gradation spectral reflectance calculation unit 102 substitutes values including the absorption coefficient $K(\lambda)$ and scattering coefficient $S(\lambda)$; the ground spectral reflectance $R_0(\lambda)$ which are respectively read from the absorption/scattering coefficient database 106 and the measured spectral reflectance database 105; and a thickness coefficient $X_m$ (as described later, thickness coefficient $X_m$ will be changed for every density gradation region) of the density gradation, for the following equation (3), i.e., Kubelka-Munk equation so as to calculate the density gradation spectral reflectance $R_{i1}(\lambda), R_{i2}(\lambda), R_{i3}(\lambda) \ldots, R_{im}(\lambda)$.

In the following equation (3), $a(\lambda)$ is a value where the scattering coefficient $S(\lambda)$ is added to the absorption coefficient $K(\lambda)$ and the addition result is divided by the scattering coefficient $S(\lambda)$. Also, $b(\lambda)$ is a value where 1 is subtracted from squared $a(\lambda)$, followed by a calculation of the square root for the subtraction result.

[Math 3]

$$R_{KM}(\lambda) = \frac{1 - R_0(\lambda)(a(\lambda) - b(\lambda)(\coth(b(\lambda)S(\lambda)X_m)))}{a(\lambda) - R_0(\lambda) + b(\lambda)(\coth(b(\lambda)S(\lambda)X_m))} \quad (3)$$

$$a(\lambda) = \frac{S(\lambda) + K(\lambda)}{S(\lambda)}$$

$$b(\lambda) = (a(\lambda)^2 - 1)^{1/2}$$

where $R_0(\lambda)$: ground reflectance
$K(\lambda)$: absorption coefficient
$S(\lambda)$: scattering coefficient
$X_m(\lambda)$: thickness coefficient In the present embodiment, the thickness coefficient $X_m$ of a printed ink in the above equation (3), i.e. Kubelka-Munk equation, is based on the print portion in which the primary color ink is solidly printed on a print medium. The thickness coefficient $X_m$ is used as a value indicating a density gradation of the print portion. In other words, the thickness coefficient $X_m$ is arbitrarily set. For example, when a solidly printed print portion with a maximum thickness of the ink has a thickness of 100% and a thickness coefficient is 1, the number 1 is divided into the number of steps m of thickness in the density gradation areas. For example, when the density gradation areas have 5-step thickness, m=1, 2, 3, 4 or 5, and the thickness coefficient $X_m$ for each density gradation areas is expressed by $X_1=1.0$, $X_2=0.8$, $X_3=0.6$, $X_4=0.4$ and $X_5=0.2$.

As described above, the thickness coefficient $X_m$ is substituted into equation (3), i.e. the Kubelka-Munk equation, together with the ground spectral reflectance $R_0(\lambda)$ of the print medium, the absorption coefficient $K(\lambda)$ and the scattering coefficient $S(\lambda)$ to calculate the density gradation spectral reflectances $R_{i1}(\lambda)$, $R_{i2}(\lambda)$, $R_{i3}(\lambda)$, ... $R_{im}(\lambda)$ as respective spectral reflectances of the density gradation areas included in a dot of each command dot area ratio. The density gradation spectral reflectances $R_{i1}(\lambda)$, $R_{i2}(\lambda)$, $R_{i3}(\lambda)$, ... $R_{im}(\lambda)$ are used, in a calculation model described later, as spectral reflectances of a plurality of respective density gradation areas configuring a dot.

The density gradation appearance ratio calculation unit 103 reads the density gradation spectral reflectances $R_{i1}(\lambda)$, $R_{i2}(\lambda)$, $R_{i3}(\lambda)$, ... $R_{im}(\lambda)$ from the density gradation spectral reflectance calculation unit 102. Further, the density gradation appearance ratio calculation unit 103 reads the measured spectral reflectances $R_s(\lambda)$ of the respective command dot area ratios from the measured spectral reflectance database 105.

Then, the density gradation appearance ratio calculation unit 103 substitutes the density gradation spectral reflectances $R_{i1}(\lambda)$, $R_{i2}(\lambda)$, $R_{i3}(\lambda)$, ... $R_{im}(\lambda)$ into the following Equation (4) (calculation model) to calculate a calculated spectral reflectance $R'(s, \lambda)$ through a process described later.

[Math 4]

$$R'(s,\lambda)=R_{i1}(\lambda)a_1(s)+R_{i2}(\lambda)a_2(s)+ \ldots +R_{im}(\lambda)a_m(s)+ R_0(\lambda)(1-a_1(s)-a_2(s)- \ldots -a_m(s)) \quad (4)$$

The density gradation appearance ratio calculation unit 103 changes the value of an appearance ratio (area ratio of each of density gradation areas configuring a dot, relative to each density gradation in a print portion of paper) in the above equation (4), while calculating the calculated spectral reflectance $R'(s, \lambda)$. Then, the density gradation appearance ratio calculation unit 103 calculates, for each command dot area ratio, a mean square error RMSE between each calculated spectral reflectance $R'(s, \lambda)$ and the measured spectral reflectance $R_s(\lambda)$ in a predetermined wavelength range.

The density gradation appearance ratio calculation section 103 calculates individual appearance ratios of density gradation areas in each of which the mean square error between the calculated spectral reflectance $R'(s, \lambda)$ and the measurement spectral reflectance $R_s(\lambda)$ is minimized. The symbol s herein indicates a command dot area ratio.

Then, the density gradation appearance ratio calculation unit 103 calculates appearance ratio function of the respective density gradation regions $a_1(s)$, $a_2(s)$, $a_3(s)$, ..., $a_m(s)$, based on each of the appearance ratio of the density gradation regions. Here, the gradation appearance ratio calculation unit 103 may use the obtained appearance ratios and perform a fitting of the appearance ratio into a quadratic function or the like of the command dot ratio s, for every density gradation region, so as to obtain the appearance ratio functions $a_1(s)$, $a_2(s)$, $a_3(s)$, ..., $a_m(s)$.

The density gradation appearance ratio calculation unit 103 stores the calculated appearance ratio functions $a_1(s)$, $a_2(s)$, $a_3(s)$, ..., $a_m(s)$ of density gradation regions into the density gradation appearance ratio table database 104.

[Math 5]

$$RMSE = \sqrt{\frac{1}{n}\sum_{\lambda=380\,nm}^{730\,nm}(R_s(\lambda)-R'(s,\lambda))^2} \quad (5)$$

In the above-described equation (5), the density gradation appearance ratio calculation unit 103 calculates, for every command dot area ratio, a mean square error RMSE where each error in respective wave lengths $\lambda$ is squared and summed, using a step width of a wavelength where the wavelength $\lambda$ from 380 nm to 730 nm is divided into n steps.

As described above, the density gradation appearance ratio calculation unit 103 uses the calculation model of the equation (4), in the printed portion where the inks corresponding to the command dot area ratio are printed, for every density gradation included in the dots, the density gradation spectral reflectance $R_{im}(\lambda)$ and the appearance ratio function of the density gradation $a_1(s)$, $a_2(s)$, $a_3(s)$, ..., $a_m(s)$ are multiplied, followed by an addition of the multiplied results, whereby the spectral reflectance $R'(s, \lambda)$ of the printed portion of the command dot area ratio (calculated spectral reflectance) is calculated.

Figure 13A:
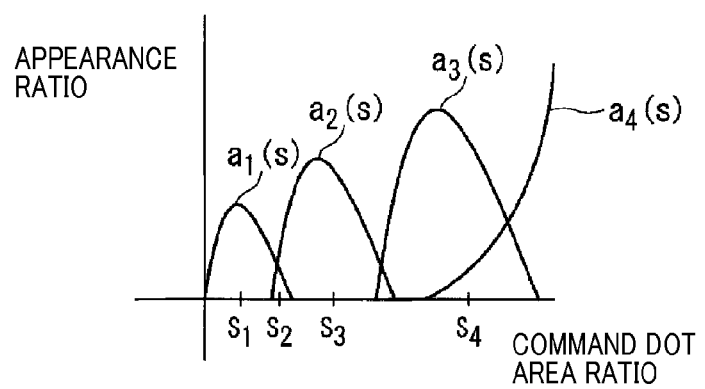
FIGS. 13A and 13B are a set of diagrams showing a correlation between a command dot area ratio and an appearance ratio of density gradation region in dots formed based on the command dot area ratio.
Figure 13B:
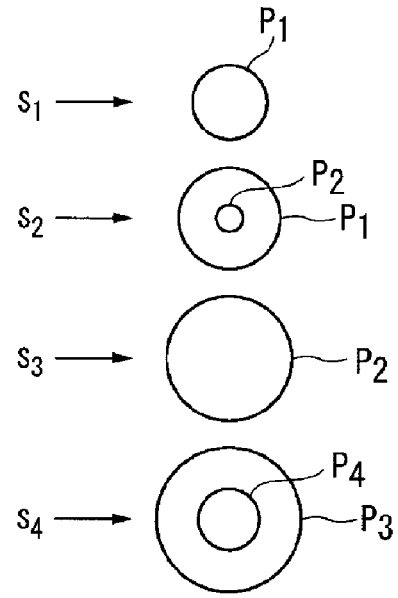

FIGS. 13A and 13B are diagrams showing a correlation between a command dot area ratio and an appearance ratio of density gradation region in dots formed based on the command dot area ratio. In FIG. 13A, the horizontal axis shows a command dot area ratio s and the vertical axis shows an appearance ratio a. By using the appearance ratio function $a_m(s)$, the appearance ratio of the respective density gradation regions in the command dot area ratio can be obtained. As described above, the density gradation appearance ratio calculation unit 103 produces a function from the appearance ratio for every density gradation region corresponding to the command dot ratio calculated in the equation (3) as an approximation of a quadratic function, thereby obtaining respective appearance ratio functions $a_m(s)$ for every density gradation region. FIG. 13A illustrates the appearance ratio functions $a_1(s)$, $a_2(s)$, $a_3(s)$ and $a_4(s)$ corresponding to every density gradation region, when m=4, i.e., 4-level density gradation.

FIG. 13B is a diagram illustrating shapes, in plan view, of dots in the respective command dot area ratios $s_1$, $s_2$, $s_3$ and $s_4$ shown in FIG. 13A. In a command dot area ratio $s_1$, only a density gradation region $P_1$ is formed. In a command dot area ratio $s_2$, a density gradation region $P_2$ is formed inside the density gradation region $P_1$. In a command dot area ratio $s_3$, only the density gradation region $P_2$ is formed. In a command dot area ratio $s_4$, a density gradation region $P_4$ is formed inside a density gradation region $P_3$. As described above, in the present embodiment, the structures of dots in gravure printing are modeled using the calculation model of equation (4) as dot structures shown in FIG. 13B.

Referring to FIG. 12 again, the density gradation appearance ratio calculation unit 103 stores the calculated appearance ratio functions $a_m(s)$, indicating the appearance ratios of the respective density gradation areas in the command dot area ratio, into the gradation appearance ratio table database 104, being correlated to the density gradation spectral reflectances of the density gradation regions. Similarly, the gradation appearance ratio calculation section 103 stores, for the rest of the primary color inks as well, the appearance ratio functions $a_m(s)$, indicating the appearance ratios of the respective density gradation regions in the command dot area ratio, into the density gradation appearance ratio table database 104.

The spot color ink spectral reflectance calculation unit 121 reads a spot color ink having the closest colorimetric value to the color sample, from the spot color inks having different combinations of the primary color inks in the approximate color database 128. The approximate color database 128 stores the colorimetric values and the formulation ratio of the primary colors of the spot color. The formulation ratio of primary colors in the read spot color ink is set as a formulation ratio of primary colors of a spot color ink used for reproducing the color sample.

Here, the color sample shows the ink colors in the ink-color sets of the print image and the reference image which are supplied from the spot color profile generation unit 14 or the reference image generation unit 17, together with the generation request of image profile table.

Further, the spot color ink spectral reflectance calculation unit 121 reads the ground spectral reflectance $R_0(\lambda)$ of the print medium from the measured spectral reflectance database 105.

The absorption/scattering coefficient calculation unit 107 reads absorption coefficients $K_1(\lambda)$ and $K_2(\lambda)$ and scattering coefficients $S_1(\lambda)$ and $S_2(\lambda)$ of the respective primary color inks, for example, primary colors #1 and #2, which are included in the set formulation ratio, from the absorption/scattering coefficient database 106.

Then, the absorption/scattering coefficient calculation unit 107 calculates the absorption coefficient $K_t(\lambda)$ and the scattering coefficient $S_t(\lambda)$ of the spot color ink in which the primary inks are mixed, based on the following equation (6). In the case where this spot color ink is used, depending on the ratio of the primary color inks to be mixed, the scattering coefficient $S_t(\lambda)$ and the absorption coefficient $K_t(\lambda)$ of the spot color ink is calculated using the following equation (6). Moreover, the spot color ink spectral reflectance calculation unit 121 stores each of the scattering coefficient $S_t(\lambda)$ and the absorption coefficient $K_t(\lambda)$ of the obtained spot color ink, into the scattering/absorption coefficient table in the temporary memory unit 125.

[Math 6]

$$K_t(\lambda) = \alpha K_1(\lambda) + \beta K_2(\lambda)$$

where $\alpha + \beta = 1$ $$S_t(\lambda) = \alpha S_1(\lambda) + \beta S_2(\lambda)$$

where $\alpha + \beta = 1$ \hfill (6)

In the above-described equation (6), each of the coefficients $\alpha$ and $\beta$ shows the ratios of the primary ink #1 and the primary ink #2 to be mixed.

The absorption coefficient $K_1(\lambda)$ of the primary ink #1 is multiplied by the coefficient $\alpha$, and the absorption coefficient $K_2(\lambda)$ of the primary ink #2 is multiplied by the coefficient $\beta$, and these multiplied values are added so as to obtain the absorption coefficient $K_t(\lambda)$. Similarly, the scattering coefficient $S_1(\lambda)$ of the primary ink #1 is multiplied by the coefficient $\alpha$ and the scattering coefficient $S_2(\lambda)$ of the primary ink #2 is multiplied by the coefficient $\beta$, and these multiplied values are added so as to obtain the scattering coefficient $S_t(\lambda)$.

Thus, the spot color ink spectral reflectance calculation unit 121 substitutes the absorption coefficient $K_t(\lambda)$ and the scattering coefficients $S_t(\lambda)$, the ground spectral reflectance $R_0(\lambda)$ of the print medium and the thickness coefficient $X_m$ of the density gradation, for the equation (3) so as to calculate a spectral reflectance $R_{KM}(\lambda)$ of the spot color ink.

The spot color ink reproduction color calculation unit 129 sets the spectral distribution of a light source of the viewing environment and a standard observer, and converts the reflectance to a colorimetric value (e.g., L*a*b* value), and outputs the converted value to the spot color ink formulation ratio determination unit 122.

The spot color ink formulation ratio determination unit 122 calculates and checks the color difference between the colorimetric value obtained by the spot color ink reproduction color calculation unit 129 and the colorimetric value of the color sample. Then, when the color difference is within a predetermined allowable range, the spot color ink formulation ratio determination unit 122 stores each of the formulation ratios corresponding to the primary color inks in the color calculated by the spot color ink spectral reflectance calculation unit 121, as a type of primary color inks composing a sample of the spot color ink and the formulation ratio thereof, together with the spot color identification information which is the identification information of the spot color ink, into the spot color ink formulation ratio table in the temporary memory unit 125.

Figure 14:
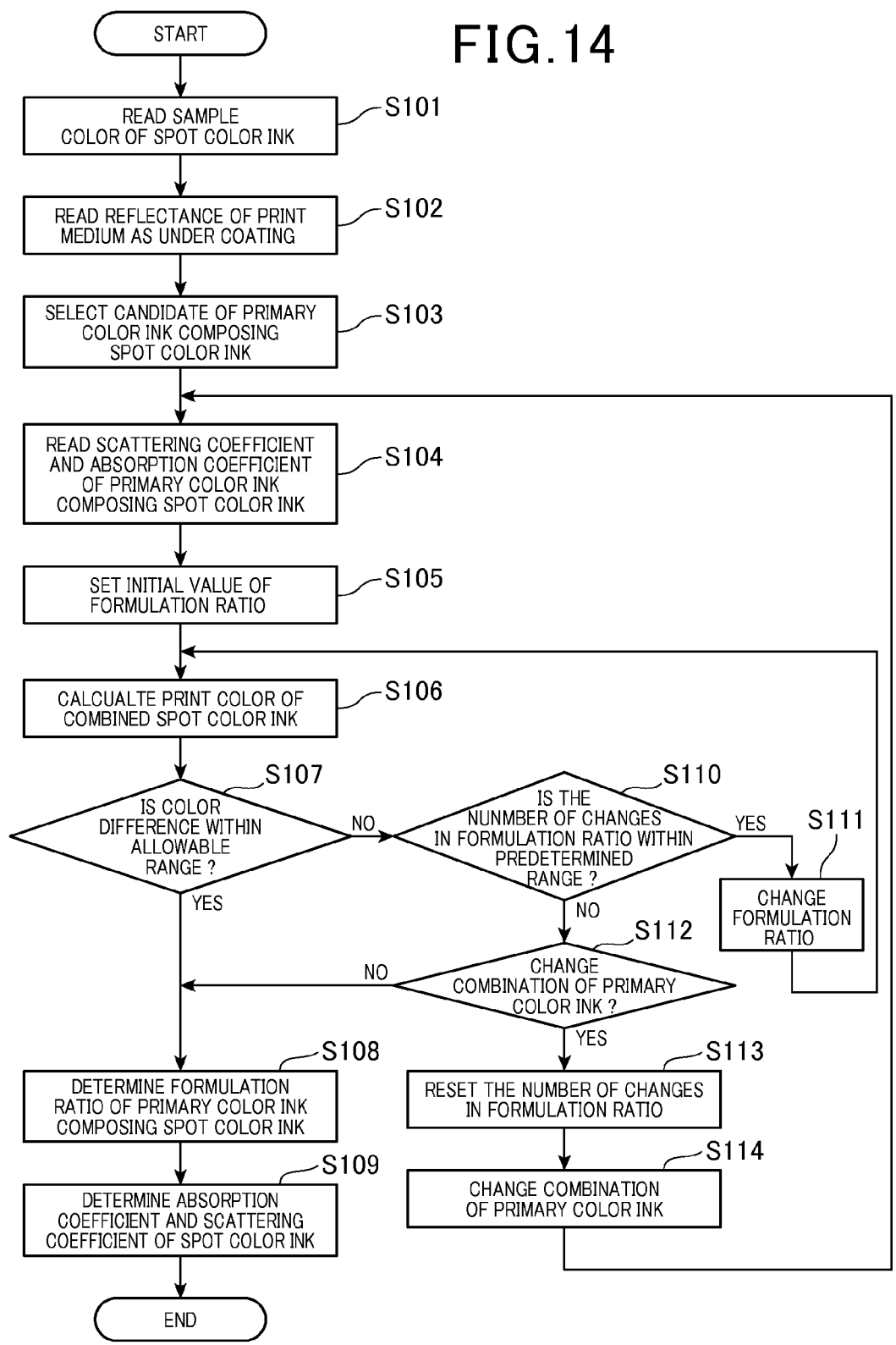
FIG. 14 is a flowchart showing determination of a formulation ratio of primary color inks composing spot color ink.

FIG. 14 is a flowchart showing a process in which the formulation ratio of the primary ink that composes the spot color ink is determined, and the absorption coefficient $K_t(\lambda)$ and the scattering coefficient $S_t(\lambda)$ of the spot color are calculated.

At step S101, the user measures the colorimetric value of the color sample used for a reproduction, and inputs the measurement result to the color estimation system 18.

At step S102, the spot color spectral reflectance calculation unit 121 reads, from the measured spectral reflectance database 105, the ground spectral reflectance $R_0(\lambda)$ which is a spectral reflectance of the print medium.

At step S103, the spot color spectral reflectance calculation unit 121 reads a combination of primary color inks composing a spot color ink, from the approximate color database 128. At this time, for example, the spot color ink spectral reflectance calculation unit 121 extracts the spot color ink having the closest colorimetric value to the colorimetric value of the color sample, from the approximate color database 128 and selects the extracted spot color ink.

At step S104, the absorption/scattering coefficient calculation unit 107 reads the scattering coefficient $S(\lambda)$ and the absorption coefficient $K(\lambda)$ of the primary color inks composing the spot color ink selected at step S103, from the absorption/scattering coefficient database 106.

At step S105, the spot color ink formulation ratio determination unit 122 sets the initial value to each formulation ratio of the primary color inks that composes the spot color ink. As the initial value, formulation ratio of the spot color ink is set, which is extracted from the approximate color database 128 at step S103.

At step S106, as shown in the equation (6), the absorption/scattering coefficient calculation unit 107 multiplies the scattering coefficient $S(\lambda)$ and the absorption coefficient $K(\lambda)$ of the primary color inks by each of the formulation ratios of the primary color inks.

Then, the absorption/scattering coefficient calculation unit 107 adds respective multiplied results, thereby calculating the scattering coefficient $S_r(\lambda)$ and the absorption coefficient $K_r(\lambda)$ of the spot color ink of the formulation ratio (e.g., expressed by $\alpha$, $\beta$ in equation (6)).

The spot color spectral reflectance calculation unit 121 substitutes the ground spectral reflectance $R_0(\lambda)$, the scattering coefficient $S_r(\lambda)$ and the absorption coefficient $K_r(\lambda)$ for the equation (3) so as to calculate the spectral reflectance of the spot color ink. Further, the spot color ink reproduction color calculation unit 129 calculates the colorimetric value based on the spectral reflectance of the spot color ink calculated by the spot color ink spectral reflectance calculation unit 121.

The spot color ink formulation ratio determination unit 122 calculates a color difference between the colorimetric value L*a*b* of the color sample and the colorimetric value L*a*b* obtained by the spot color ink reproduction color calculation unit 129.

At step S107, the spot color ink formulation ratio determination unit 122 determines whether or not the above-described color difference is within an allowable range. At this time, the spot color ink formulation ratio determination unit 122 advances the process to step S108 when the color difference is within the allowable range. Meanwhile, the spot color ink formulation ratio determination unit 122 advances the process to step S110 when the color difference is not within the allowable range.

At step S108, the spot color ink formulation ratio determination unit 122 sets the formulation ratio of the primary color inks in the spot color ink corresponding to the color sample to be the current formulation ratio. Then, the spot color ink formulation ratio determination unit 122 stores the type of primary color inks in the spot color ink and each of the formulation ratios of the primary color inks into the formulation ratio table in the temporary memory unit 125.

At step S109, the spot color ink formulation ratio determination unit 122 determines the scattering coefficient $S_r(\lambda)$ and the absorption coefficient $K_r(\lambda)$ of the spot color ink corresponding to the color sample, to be the current scattering coefficient $S_r(\lambda)$ and absorption coefficient $K_r(\lambda)$. Then, the spot color ink formulation ratio determination unit 122 stores the scattering coefficient $S_r(\lambda)$ and the absorption coefficient $K_r(\lambda)$ of the spot color ink, into the scattering/absorption coefficient table of the temporary memory unit 125.

At step S110, the spot color ink formulation ratio determination unit 122 determines whether or not the number of changes for the formulation ratio is within a predetermined range. At this time, the spot color ink formulation ratio determination unit 122 advances the process to step S111, when the number of changes for the formulation ratio is within the predetermined range. Meanwhile, the spot color ink formulation ratio determination unit 122 advances the process to step S112, when the number of changes for the formulation ratio exceeds the predetermined range.

At step S111, the spot color ink formulation ratio determination unit 122 changes each formulation ratio of the primary color inks which compose the spot color ink. Then, the spot color ink formulation ratio determination unit 122 increments a counter that counts the number of changes for the formulation ratio (increases count value by 1), and advances the process to S106.

At step S112, the spot color ink formulation ratio determination unit 122 displays a selecting screen on the display unit (not shown) in the color estimation system 18, prompting the user to change or not to change the combination of the primary color inks. The spot color ink formulation ratio determination unit 122 advances the process to step S113, when the user decides to change the combination of the primary color inks. Meanwhile, the spot color ink formulation ratio determination unit 122 advances the process to step S108.

At step S113, the spot color ink formulation ratio determination unit 122 resets the counter that counts the number of changes for the formulation ratio such that the counter value, i.e., the number of change is set to zero.

At step S114, the spot color ink formulation ratio determination unit 122 outputs a control signal that changes the combination of the primary color inks, to the spot color inK spectral reflectance calculation unit 121. The spot color ink spectral reflectance calculation unit 121 reads anew the combination of the primary color inks composing the spot color ink, from the approximate color database 128.

Referring back to FIG. 12, the spot color ink density gradation appearance ratio calculation unit 123 calculates, for each density gradation region of a spot color ink that has been produced by mixing primary color inks at a predetermined ratio, an appearance ratio function $a_m(s)$. Then, the spot color ink density gradation appearance ratio calculation unit 123 stores the calculated appearance ratio functions $a_m(s)$ in a spot color ink density gradation appearance ratio table in the temporary memory unit 125. In this case, the spot color ink density gradation appearance ratio calculation unit 123 reads appearance ratio functions $a_m(s)$ of any of the primary color inks configuring the spot color ink from the density gradation appearance ratio table database 104, and use it as an appearance ratio functions $a_m(s)$ of the spot color ink. The spot color ink density gradation appearance ratio calculation unit 123 may combine the appearance ratio functions $a_m(s)$ of the respective primary color inks configuring the spot color ink in accordance with the formulation ratio of the primary color inks, for use as appearance ratio functions $a_m(s)$ of the spot color ink.

Hereinafter, an operation of the spectral reflectance estimation unit 108 will be described.

The spectral reflectance estimation unit 108 is provided with an expanded Neugebauer primary color calculation unit 1081, an expanded Neugebauer primary color appearance ratio calculation unit 1082 and a spectral reflectance calculation unit 1083. The expanded Neugebauer primary color calculation unit 1081 determines an ink to be used as an under coating (primary color inks or spot color ink), and an ink to be printed on a surface of the under coating, based on the order of colors to be overlaid when the print image or the reference image is printed. The expanded Neugebauer primary color calculation unit 1081 reads each of the command dot area ratios of the inks to be overlaid, from the input unit 101.

The expanded Neugebauer primary color calculation unit 1081 reads the scattering coefficient $S(\lambda)$ and absorption coefficient $K(\lambda)$ of the primary color ink overlaid on the under coat ink (ground ink), from the scattering absorption coefficient database 106. The expanded Neugebauer primary color calculation unit 1081 reads the scattering coefficient $S_r(\lambda)$ and absorption coefficient $K_r(\lambda)$ of the spot color inks overlaid on the under coat ink, from the scattering/absorption coefficient table in the temporary memory unit 125.

The expanded Neugebauer primary color calculation unit 1081 substitutes the density gradation spectral reflectance $R_{im}(\lambda)$ of the density gradation region in the dots of the under coat ink (spot color ink or primary color ink) as the ground spectral reflectance $R_0(\lambda)$ for the equation (3), and substitutes the scattering coefficient $S(\lambda)$ and absorption coefficient $K(\lambda)$ of the inks overlaid on the under coat ink, and a thickness coefficient $X_m$ of the density gradation region for the equation (3), thereby calculating the density gradation spectral reflectance $R_{im}(\lambda)$ in the density gradation region which composes the dots of the ink printed being overlaid on the under coat ink.

The expanded Neugebauer primary color calculation unit 1081 performs the calculation of the density gradation region of the dots of the above-described under coat ink, and the density gradation spectral reflectance $R_{im}(\lambda)$ in overlapped portion where the density gradation regions composing dots of the ink printed on the undercoat ink are overlapped, for all combinations of the density gradation region of the dots in the under coat ink, and the density gradation region of the dots of the ink (spot color ink or primary color inks) printed on the dots of the under coat ink.

Figure 15:
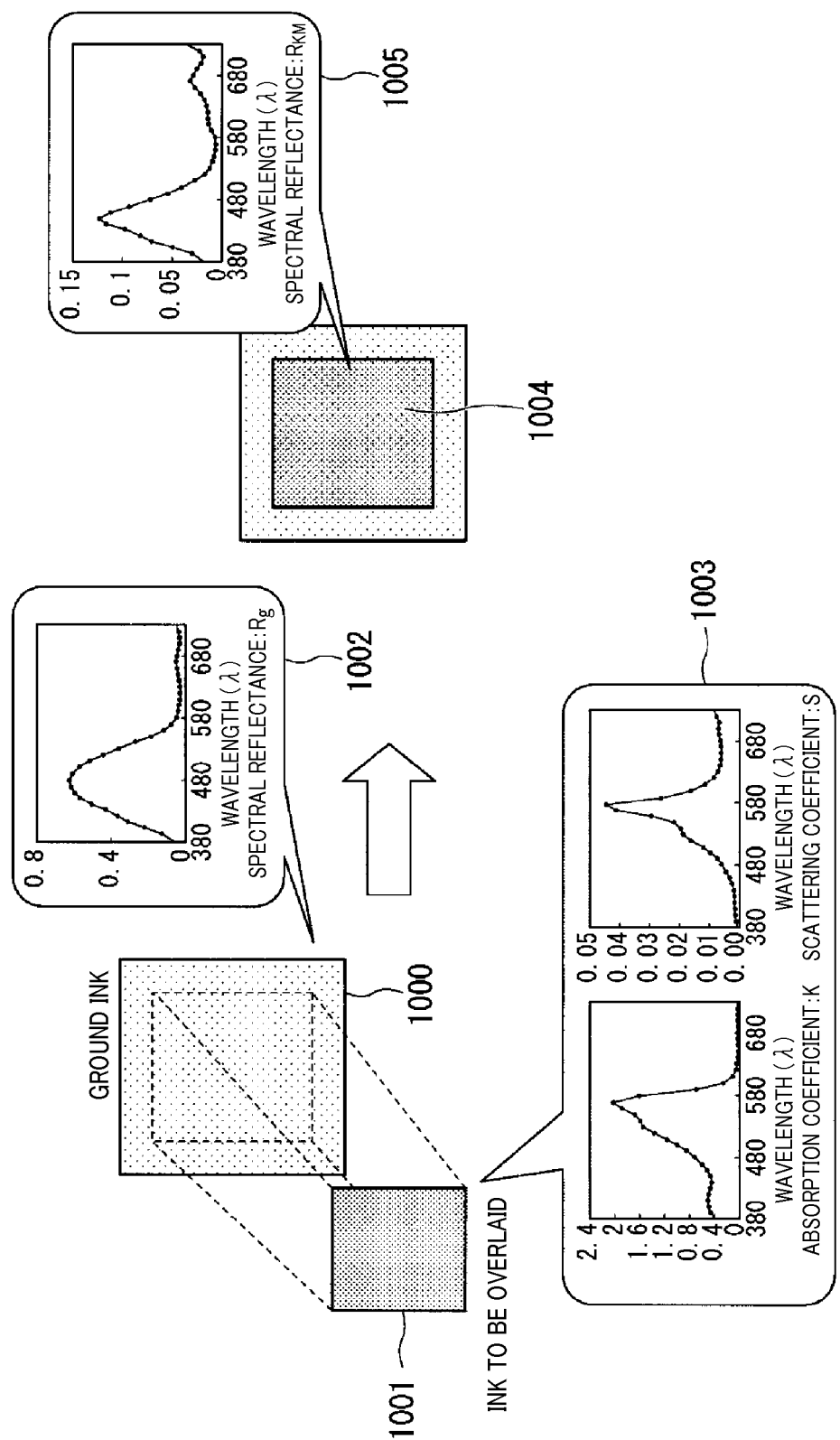
FIG. 15 is a diagram showing a calculation of a density gradation spectral reflectance $R_{im}(\lambda)$ of ink which is printed being overlaid on an under-coat ink.

FIG. 15 is a diagram showing a calculation of a density gradation spectral reflectance $R_{im}(\lambda)$ of ink which is printed to be overlaid on an under-coat ink. The density gradation spectral reflectance calculation unit 102 determines the spectral reflectance of the print medium to be the ground spectral reflectance $R_0(\lambda)$, and uses the absorption coefficient $K(\lambda)$ and the scattering coefficient $S(\lambda)$ in a region of ink 1000, thereby calculating, from the equation (3), the spectral reflectance $R_{im}(\lambda)$ of the density gradation region of the dots in a region of the ink 1000 (spot color ink or primary color inks) printed on the print medium.

Then, the expanded Neugebauer primary color calculation unit 1081 calculates, with respect to the ink 1000 having a spectral reflectance illustrated in 1002, a spectral reflectance $R_{KM}(\lambda)$ illustrated in 1005 above the ink region 1004 shown in FIG. 15. Here, the expanded Neugebauer primary color calculation unit 1081 determines the spectral reflectance $R_{KM}(\lambda)$ of the density gradation region of the dots in the region 1000 to be the ground spectral reflectance $R_0(\lambda)$ and substitutes the absorption coefficient $K(\lambda)$ and the scattering coefficient $S(\lambda)$ of the ink 1001 shown in the region 1003 and the thickness coefficient $X_m$, for the equation (3) so as to calculate the spectral reflectance region $R_{KM}(\lambda)$ of the density gradation region in the dots of the region 1004, which is a region of the ink 1001 (spot ink or primary color inks) overlaid on the region 1000.

Thus, the expanded Neugebauer primary color calculation section 1081 calculates, as will be described later, the spectral reflectance $R_{KM}(\lambda)$ of an overlapped area in a density gradation region of a dot of the ink (a spot color ink or a primary color ink) overprinted on a dot of the ground ink, in respect of all the combinations of the density gradation regions in a dot of the ground ink with the density gradation regions in a dot of the overprinted ink. Thus, the spectral reflectances $R_{KM}(\lambda)$ are calculated for a print portion in which the ink is overprinted. The expanded Neugebauer primary color calculation section 1081 writes and stores the calculated spectral reflectances $R_{KM}(\lambda)$ in the expanded Neugebauer primary color table of the temporary memory unit 125.

Figure 16:
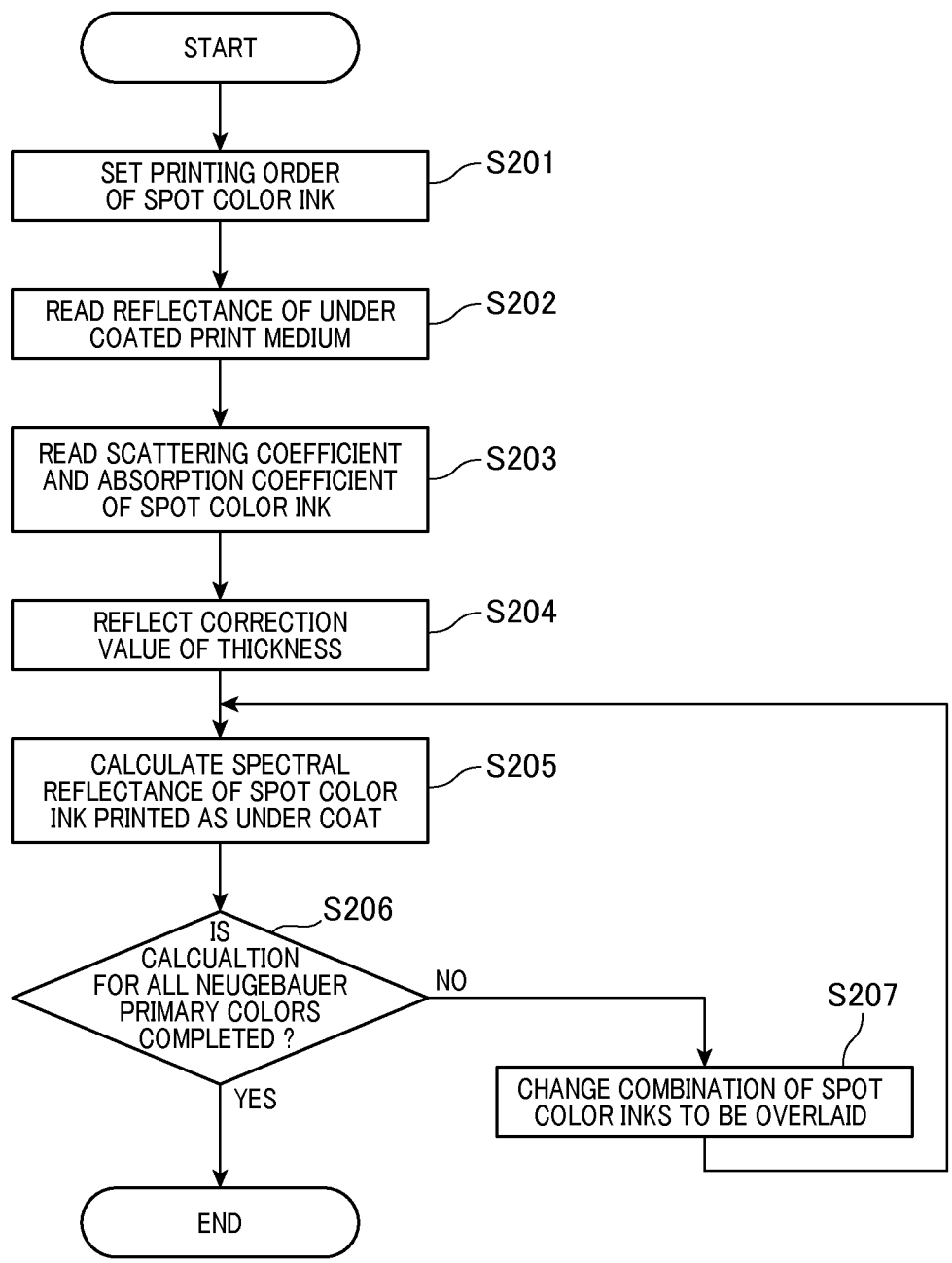
FIG. 16 is a flowchart showing a process that calculates Neugebauer primary color by overlaying the spot color ink.

FIG. 16 is a flowchart showing a process that calculates expanded Neugebauer primary color by overlaying the spot color ink. As for the ink to be overlaid, the primary color inks and the spot color ink may be combined.

At step S201, corresponding to combinations of the spot color inks, the user inputs the printing order of the spot color ink for every combination to set them in the color estimation system.

At step S202, the expanded Neugebauer primary color calculation unit 1081 reads the ground spectral reflectance $R_0(\lambda)$ which is a spectral reflectance of the print medium from the measured spectral reflectance database 105.

At step S203, the expanded Neugebauer primary color calculation unit 1081 reads the scattering coefficient $S(\lambda)$ and the absorption coefficient $K(\lambda)$ of the spot color ink to be overlaid, from the scattering/absorption coefficient table of the temporally memory unit 125.

At step S204, the expanded Neugebauer primary color calculation unit 1081 stores the thickness coefficient used for the equation (3) into an internal memory, in order to reflect the thickness coefficient which is an user-input thickness correction value to the spectral reflectance.

At step S205, the expanded Neugebauer primary color calculation unit 1081 calculates the spectral reflectance $R_{KM}(\lambda)$ of a printed matter in which a spot color ink or a primary color inks are printed as an under coating. At this time, the expanded Neugebauer primary color calculation unit 1081 calculates the Neugebauer primary color for all the combinations of the thickness coefficients of the spot color inks to be overlaid with each other. In other words, the expanded Neugebauer primary color calculation unit 1081 calculates the spectral reflectance $R_{KM}(\lambda)$ of the spot color ink printed on the print medium of an under coating, so as to determine the calculated spectral reflectance $R_{KM}(\lambda)$ as a spectral reflectance of a new under coating. Then, the expanded Neugebauer primary color calculation unit 1081 calculates a spectral reflectance in the case where a new spot color ink is overlaid on the spot color ink having the calculated spectral reflectance $R_{KM}(\lambda)$, so as to obtain the spectral reflectance $R_{KM}(\lambda)$ of the expanded Neugebauer primary color.

Here, in the case where a solid process ink is used for the under coating for example, so that the measured value of the spectral reflectance is already known in advance, the calculated spectral reflectance is not used, but a spectral reflectance which is a measured value may be used for a spectral reflectance of the under coating used for overlaying. The expanded Neugebauer primary color calculation unit 1081 stores the calculated spectral reflectance $R_{KM}(\lambda)$ into the expanded Neugebauer primary color table in the temporary memory unit 125.

At step S206, the expanded Neugebauer primary color calculation unit 1081 determines whether or not the calculation of the Neugebauer primary colors for all combinations of the spot color inks has been completed. At this time, the expanded Neugebauer primary color calculation unit 1081 terminates the process, when the calculation of all Neugebauer primary colors has been completed. Alternatively, the expanded Neugebauer primary color calculation unit 1081 advances the process to step S207, when the calculation of all Neugebauer primary colors has not been completed.

At step S207, the expanded Neugebauer primary color calculation unit 1081 changes the combination of the spot color inks and advances the process to step S205.

Referring back to FIG. 1, expanded Neugebauer primary color appearance ratio calculation unit 1082 calculates the appearance ratio of an overlaid portion between the density gradation region of the under coat ink and the density gradation region of ink to be printed being overlaid on the under coat ink.

Figure 17A:
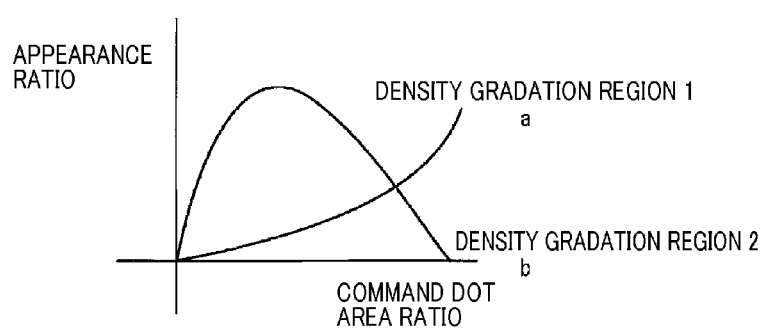
FIGS. 17A and 17B are diagrams showing calculation of an appearance ratio of an overlaid portion between a density gradation region of an under-coat ink and a density gradation region of an ink to be printed being overlaid on the under-coat ink (spot color ink or primary color inks)
Figure 17B:
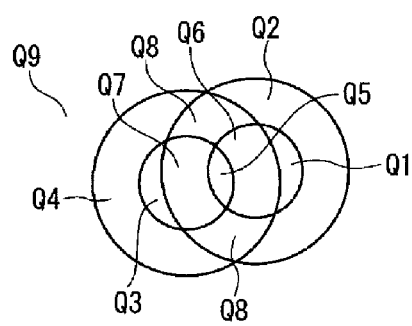

FIGS. 17A and 17B are diagrams showing a calculation of an appearance ratio of an overlaid portion between a density gradation region of an under-coat ink and a density gradation region of ink to be printed overlaying on the under-coat ink (spot color ink or primary color inks).

In FIGS. 17A and 17B, to simplify the explanation, two types of ink are used for an overlay, and also two types of the density gradation regions are used. However, three or more types of the ink to be overlaid and three or more density gradation regions may be used to calculate the appearance ratio of the overlaid portion between a density gradation region of an under-coat ink and a density gradation region of the ink to be printed overlaying on the under-coat ink, similar to the process described below.

FIG. 17A illustrates a case where inks #1 and #2 each have two types of density gradation regions and illustrates correlation between the command dot area ratio (setting dot %) of the ink #1 and the appearance ratios of a core and a fringe which are a density gradation region appearing in the dots of the command dot area ratio. The ink #2 has similar correlation to that of the ink #1. Each of the ink #1 and the ink #2 is either a primary color ink or a spot color ink. Each of the ink #1 and the ink #2 has two types of density gradation regions including a density gradation core region 1 and a density gradation fringe region 2, in which the density gradation core region 1 has a thickness of 100% and the density gradation region 2 has a thickness of 50%. Also, other inks have similar correlation.

FIG. 17B illustrates overlaid portions produced by the density gradation core region 1 and the density gradation fringe region 2. In FIG. 17B, for example, the ink #1 is cyan (C) and the ink #2 is magenta (M). A combination of the overlaid portions produced by the density gradation core region 1 and the density gradation fringe region 2 include 9 regions, i.e., from a region Q1 to a region Q9. The region Q1 is a region having only the cyan density gradation core region 1. The region Q2 is a region having only the density gradation fringe region 2 of cyan. The region Q3 is a region having only the density gradation core region 1 of magenta. The region Q4 is a region having only the density gradation fringe region 2 of magenta. The region Q5 is a region where respective density gradation core regions 1 of cyan and magenta are overlapped. The region 6 is a region where the density gradation fringe region 2 of magenta and the density gradation core region 1 are overlapped. The region Q7 is a region where the density gradation core region 1 of magenta and the density gradation fringe region 2 of cyan are overlapped. The region Q8 is a region where respective density gradation fringe regions 2 of cyan and magenta are overlapped. The region 9 is a region where no ink of cyan or magenta is present.

FIG. 18 is a diagram of a table showing a calculation result for respective appearance ratios corresponding to the region Q1 to the region Q9 shown in FIG. 17B. In FIG. 18, the primary color ink C (cyan) and M (magenta) are described. However, similarly, the appearance ratio is calculated for the spot color ink. In this table, C shows a density gradation region of cyan, M shows a density gradation region of magenta, CM shows a region where density gradation regions of cyan and magenta are overlapped, and W shows a region where none of the inks such as cyan or magenta is present. In FIG. 18, the appearance ratio $\alpha 1$ shows an appearance ratio of the density gradation core region 1 of cyan, the appearance ratio $\alpha 2$ is an appearance ratio of the density gradation fringe region 2 of cyan. The appearance ratio $\alpha 0$ is sum of the appearance ratio $\alpha 1$ and the appearance ratio $\alpha 2$ ($\alpha 0 = \alpha 1 + \alpha 2$). The appearance ratio $\beta 1$ is an appearance ratio of the density gradation core region 1 of magenta, the appearance ratio $\beta 2$ is an appearance ratio of the density gradation fringe region 2 of magenta, and the appearance ratio $\beta 0$ is sum of the appearance ratio $\beta 1$ and the appearance ratio $\beta 2$ ($\beta 0 = \beta 1 + \beta 2$).

A primary dimension appearance ratio of the regions Q1 and Q2 is defined as $\alpha 0 * (1 - \beta 0)$, where the appearance ratio $\alpha 0$ of the cyan ink is multiplied by a ratio $(1 - \beta 0)$ in which the magenta ink does not appear, representing an appearance ratio of a region having only the cyan ink. According to the present embodiment, * represents a multiplication. A primary dimension appearance ratio of the regions Q3 and Q4 is defined as $\beta 0 * (1 - \alpha 0)$, where the appearance ratio $\beta 0$ of the magenta ink is multiplied by a ratio $(1 - \alpha 0)$ in which the cyan ink does not appear, representing an appearance ratio of a region having only the magenta ink.

A primary dimension appearance ratio of the regions from Q5 to Q8 is defined as $\alpha 0 * \beta 0$ where the appearance ratio $\alpha 0$ of the cyan ink is multiplied by an appearance ratio $\beta 0$ of the magenta ink, representing an appearance ratio of a region where the cyan ink and the magenta ink are overlapped. A primary dimension appearance ratio of the region Q9 is defined as $(1 - \alpha 0) * (1 - \beta 0)$, in which a ratio $(1 - \alpha 0)$ where no cyan ink appears is multiplied by a ratio $(1 - \beta 0)$ where no magenta ink appears, representing an appearance ratio of a region where neither of the cyan ink and the magenta ink are present.

The region Q1 has a subsidiary appearance ratio that is an appearance ratio of only the density gradation core region 1 in a dot of the cyan ink, and is obtained by dividing the appearance ratio $\alpha 1$ of the density gradation core region 1 by the sum of the appearance ratio $\alpha 1$ of the density gradation core region 1 and the appearance ratio $\alpha 2$ of the density gradation fringe region 2.

The region Q2 has a subsidiary appearance ratio that is an appearance ratio showing only the density gradation fringe region 2 in a dot of the cyan ink, and is obtained by dividing the appearance ratio $\alpha 1$ of the density gradation core region 1 by the sum of the appearance ratio $\alpha 1$ of the density gradation core region 1 and the appearance ratio $\alpha 2$ of the density gradation fringe region 2, and subtracting the result of the division from 1.

The region Q3 has a subsidiary appearance ratio that is an appearance ratio of only the density gradation core region 1 in a dot of the magenta ink, and is obtained by dividing the appearance ratio $\beta 1$ of the density gradation core region 1 by the sum of the appearance ratio $\beta 1$ of the density gradation core region 1 and the appearance ratio $\beta 2$ of the density gradation fringe region 2.

The region Q4 has a subsidiary appearance ratio that is an appearance ratio of only the density gradation fringe region 2 in a dot of the magenta ink and is obtained by dividprimary dimensioning the appearance ratio $\beta 1$ of the density gradation core region 1 by the sum of the appearance ratio $\beta 1$ of the density gradation core region 1 and the appearance ratio $\beta 2$ of the density gradation fringe region 2, and subtracting the result of the division from 1.

The region Q5 has a subsidiary appearance ratio that is an appearance ratio of a portion where the density gradation core regions 1 in the dots of the respective cyan and magenta inks overlap with each other. In obtaining the subsidiary appearance ratio of the region Q5, the appearance ratio $\alpha 1$ of the density gradation core region 1 in a dot of the cyan ink is divided by the sum of the appearance ratio $\alpha 1$ of the density gradation core region 1 and the appearance ratio $\alpha 2$ of the density gradation fringe region 2 to obtain a first value. Then, the appearance ratio $\beta 1$ of the density gradation core region 1 in a dot of the magenta ink is divided by the sum of the appearance ratio $\beta 1$ of the density gradation core region 1 and the appearance ratio $\beta 2$ of the density gradation fringe region 2 to obtain a second value. Then, the first value is multiplied by the second value.

The region Q6 has a subsidiary appearance ratio that is an appearance ratio of a portion where the density gradation core region 1 in a dot of the cyan ink overlaps with the density gradation fringe region 2 in a dot of the magenta ink. In obtaining the subsidiary appearance ratio of the region Q6, the appearance ratio α1 of the density gradation core region 1 in a dot of the cyan ink is divided by the sum of the appearance ratio α1 of the density gradation core region 1 and the appearance ratio α2 of the density gradation fringe region 2 to obtain a third value. Then, the appearance ratio β1 of the density gradation core region 1 in a dot of the magenta ink is divided by the sum of the appearance ratio β1 of the density gradation core region 1 and the appearance ratio β2 of the density gradation fringe region 2, followed by subtracting the resultant value from 1, to obtain a fourth value. Then, the third value is multiplied with the fourth value.

The region Q7 has a subsidiary appearance ratio that is an appearance ratio in a portion where the density gradation fringe region 2 in a dot of the cyan ink overlaps with the density gradation core region 1 in a dot of the magenta ink. In obtaining the subsidiary appearance ratio of the region Q7, the appearance ratio α1 of the density gradation core region 1 in a dot of the cyan ink is divided by the sum of the appearance ratio α1 of the density gradation core region 1 and the appearance ratio α2 of the density gradation fringe region 2, followed by subtracting the resultant value from 1, to obtain a fifth value. Then, the appearance ratio β1 of the density gradation core region 1 in a dot of the magenta ink is divided by the sum of the appearance ratio β1 of the density gradation core region 1 and the appearance ratio β2 of the density gradation fringe region 2 to obtain a sixth value. Then, the fifth value is multiplied with the sixth value.

The regions Q8 each have a subsidiary appearance ratio that is an appearance ratio in a portion where the density gradation fringe region 2 in a dot of the cyan ink overlaps with the density gradation fringe region 2 in a dot of the magenta ink. In obtaining the subsidiary appearance ratio of each region Q8, the appearance ratio α1 of the density gradation core region 1 in a dot of the cyan ink is divided by the sum of the appearance ratio α1 of the density gradation core region 1 and the appearance ratio α2 of the density gradation fringe region 2, followed by subtracting the resultant value from 1, to obtain a seventh value. Then, the appearance ratio β1 of the density gradation core region 1 in a dot of the magenta ink is divided by the sum of the appearance ratio β1 of the density gradation core region 1 and the appearance ratio β2 of the density gradation fringe region 2, followed by subtracting the resultant value from 1, to obtain an eighth value. Then, the seventh value is multiplied with the eighth value.

The region Q9 has a subsidiary appearance ratio that is an appearance ratio of a region where neither of the cyan and magenta inks is present. The subsidiary appearance ratio of the region Q9 is 1.

As described above, the formulas of appearance ratio used for the overlaps of the inks to be used are set in advance and written and stored, in the form of a table as shown in FIG. 18, into the density gradation appearance ratio table database 104.

Referring to FIG. 12 again, the expanded Neugebauer primary color appearance ratio calculation section 1082 reads formulas from the table of FIG. 18 stored in the density gradation appearance ratio table database 104, according to the combination of the kinds of inks to be overlapped with each other, and the combination of the command dot area ratios expressing dots of the respective inks to be overlapped with each other.

Further, the expanded Neugebauer primary color appearance ratio calculation section 1082 reads the appearance ratios α1, α2, β1 and β2 of the density gradation core regions 1 and the density gradation fringe regions 2 of cyan and magenta, from the density gradation appearance ratio table database 104.

When cyan is used as the under coating and magenta is overlaid on the cyan, the expanded Neugebauer primary color calculation unit 1081 calculates the spectral reflectance $R_{KM}(\lambda)$ of the density gradation region in the overlaid portion in accordance with the equation (3), using the spectral reflectance of cyan as the ground spectral reflectance $R_0(\lambda)$ and the thickness of the density gradation region of magenta appearing based on the command dot area ratio. For example, the expanded Neugebauer primary color calculation unit 1081, when calculating the spectral reflectance $R_{KM}(\lambda)$ in the region Q5, calculates the spectral reflectance $R_{KM}(\lambda)$ of a print portion in an overlaid portion where magenta ink having a thickness of 100% is overlaid, using the density gradation spectral reflectance $R_{im}(\lambda)$ corresponding to a portion having 100% of thickness of cyan ink on the print medium, as the ground spectral reflectance $R_0(\lambda)$.

Similarly, the expanded Neugebauer primary color calculation unit 1081, when calculating the spectral reflectance $R_{KM}(\lambda)$ in the region Q7, calculates the spectral reflectance $R_{KM}(\lambda)$ in the case where magenta ink having a thickness of 100% is overlaid, using the density gradation spectral reflectance $R_{im}(\lambda)$ corresponding to a portion having 50% of thickness of cyan ink on the print medium, as the ground spectral reflectance $R_0(\lambda)$. Further, the spectral reflectance $R_{KM}(\lambda)$ is calculated for all combinations of the expanded Neugebauer primary color.

The spectral reflectance calculation unit 1083 multiplies respective spectral reflectance corresponding to the expanded Neugebauer primary color of the above-described regions Q1 to Q9 by the expanded Neugebauer primary color appearance ratio, and adds them for every wavelength. The spectral reflectance calculation unit 1083 calculates a first estimated spectral reflectance $R_{D1}(\lambda)$ of a print portion in the case where the dots of the magenta ink are printed being overlaid with respect to the print medium where dots of cyan ink are printed.

Hereinafter, a calculation of density gradation appearance ratio using a spectral optical density will be described.

The density gradation spectral-optical density calculation unit 202 reads, depending on type of the primary color inks supplied from the input unit 101, the absorption coefficient $K(\lambda)$ and the scattering coefficient $S(\lambda)$ of a colored layer calculated from a printed portion printed on a print medium with a solid printing of a primary color inks, from the absorption/scattering coefficient database 106. The density gradation spectral-optical density calculation unit 202 reads the measured spectral reflectance $R_s(\lambda)$ for every command dot area ratio and the ground spectral reflectance $R_0(\lambda)$ of a print medium, from the measured spectral reflectance database 105, depending on a type of the primary color inks and a type of the print medium supplied from the input unit 101.

The density gradation spectral-optical density calculation unit 202 substitutes each of the absorption coefficient $K(\lambda)$ and the scattering coefficient $S(\lambda)$ of the read primary ink, the ground spectral reflectance $R_0(\lambda)$ of the print medium and the thickness coefficient $X_m$ of the density gradation for the above-described equation (3), i.e., Kubelka-Munk equation, so as to calculate the density gradation spectral reflectance $R_{i1}(\lambda)$, $R_{i2}(\lambda)$, $R_{i3}(\lambda)$, ..., $R_{im}(\lambda)$ as a spectral reflectance of the density gradation region.

Further, the density gradation spectral-optical density calculation unit 202 converts the calculated density gradation spectral reflectance $R_{i1}(\lambda)$, $R_{i2}(\lambda)$, $R_{i3}(\lambda)$, ..., $R_{im}(\lambda)$ to the density gradation spectral-optical densities $OD_{i1}(\lambda)$, $OD_{i2}(\lambda)$, $OD_{i3}(\lambda)$, ..., $OD_{im}(\lambda)$ respectively, based on the following equation (7).

[Math 7]

$$D(\lambda) = -\ln(R(\lambda)) \quad (7)$$

Similar to the density gradation spectral reflectance calculation unit 102, according to the density gradation spectral-optical density calculation unit 202, the thickness coefficient $X_m$ of the printed ink expressed in the equation (3), i.e., Kubelka-Munk equation, is based on the printed portion printed on a print medium with a solid printing of a primary color inks, and used for a value showing a density gradation of the printed portion. Specifically, the thickness coefficient $X_m$ is set to any value, for example, assuming the thickness of a solid printed portion having the largest thickness of the ink is 100% and the above-described thickness coefficient is 1, this coefficient 1 is divided into m in number corresponding to the number of steps m of the thickness in the density gradation region. For example, assuming five steps of the thickness in the density gradation region specified by the command dot area ratio is used, then m=1, 2, 3, 4 and 5, and the thickness coefficient $X_m$ is: $X_1=1.0$, $X_2=0.8$, $X_3=0.6$, $X_4=0.4$, $X_5=0.2$, corresponding to respective steps of the thickness in the density gradation region.

As described above, the thickness coefficient $X_m$ together with the ground spectral reflectance $R_0(\lambda)$ of the print medium, the absorption coefficient $K(\lambda)$ and the scattering coefficient $S(\lambda)$ are substituted for the equation (3), i.e., Kubelka-Munk equation so as to calculate the density gradation spectral reflectance $R_{i1}(\lambda)$, $R_{i2}(\lambda)$, $R_{i3}(\lambda)$, ..., $R_{im}(\lambda)$ as a spectral reflectance of the density gradation region included in the dots of the command dot area ratio. Then, density gradation spectral reflectance $R_{i1}(\lambda)$, $R_{i2}(\lambda)$, $R_{i3}(\lambda)$, ..., $R_{im}(\lambda)$ are converted to the density gradation spectral-optical densities $OD_{i1}(\lambda)$, $OD_{i2}(\lambda)$, $OD_{i3}(\lambda)$, ..., $OD_{im}(\lambda)$ respectively, by using the equation (7). These density gradation spectral-optical densities $OD_{i1}(\lambda)$, $OD_{i2}(\lambda)$, $OD_{i3}(\lambda)$, ..., $OD_{im}(\lambda)$ are used for respective spectral-optical densities in a plurality of density gradation regions which configure the dots, which will be used in a calculation model described later.

The density gradation appearance ratio calculation unit 203 reads the density gradation spectral-optical densities $OD_{i1}(\lambda)$, $OD_{i2}(\lambda)$, $OD_{i3}(\lambda)$, ..., $OD_{im}(\lambda)$, from the density gradation spectral-optical density calculation unit 202. Also, the density gradation appearance ratio calculation unit 203 reads the measured spectral reflectance $R_s(\lambda)$ for every command dot area ratio, from the measured spectral reflectance database 105.

Then, the density gradation appearance ratio calculation unit 203 uses the equation (7), thereby converting the respective measurement spectral reflectance $R_s(\lambda)$ to a measured spectral-optical density $OD_s(\lambda)$.

Subsequently, the density gradation appearance ratio calculation unit 203 substitutes the density gradation spectral-optical densities $OD_{i1}(\lambda)$, $OD_{i2}(\lambda)$, $OD_{i3}(\lambda)$, ..., $OD_{im}(\lambda)$ for the following equation (8) (calculation model), thereby calculating a calculated spectral-optical density $OD'(s, \lambda)$ with a process which will be described later.

[Math 8]

$$OD'(s,\lambda) = OD_{i1}(\lambda)a_1(s) + OD_{i2}(\lambda)a_2(s) + \ldots + OD_{im}(\lambda)a_m(s) + OD_0(\lambda)(1 - a_1(s) - a_2(s) - \ldots - a_m(s)) \quad (8)$$

Here, the density gradation appearance ratio calculation unit 203 changes the value of the appearance ratio (area ratio of the density gradation region corresponding to the density gradations which composes the dots in the print portion of the paper) in the following equation (9) so as to calculate the calculated spectral-optical density $OD'(s, \lambda)$. Then, the density gradation appearance ratio calculation unit 203 calculates a mean square error RMSE between each of the calculated spectral-optical density $OD'(s, \lambda)$, and each of the measured spectral-optical density $OD_S(\lambda)$, in a predetermined wavelength range for every command dots area ratio. The density gradation appearance ratio calculation unit 203 obtains the appearance ratio of each of the density gradation region where the mean square error between the calculated spectral-optical density $OD'(s, \lambda)$ and the measured spectral-optical density $OD_S(\lambda)$ becomes minimum. Here, s is the command dot area ratio.

Then, the density gradation appearance ratio calculation unit 203 calculates appearance ratio functions of the respective density gradation regions $a_1(s)$, $a_2(s)$, $a_3(s)$, ..., $a_m(s)$, based on each of the appearance ratio of the density gradation regions.

Here, the density gradation appearance ratio calculation unit 203 may use the obtained appearance ratios and perform a fitting of the appearance ratio into a quadratic function or the like of the command dot ratio s, for every density gradation region, so as to obtain the appearance ratio functions.

The density gradation appearance ratio calculation unit 203 stores the calculated appearance ratio functions $a_1(s)$, $a_2(s)$, $a_3(s)$, ..., $a_m(s)$ of the density gradation regions into the density gradation appearance ratio table database 204. Similar to the description of the spectral reflectance estimation unit 108, the appearance ratio functions $a_1(s)$, $a_2(s)$, $a_3(s)$, ..., $a_m(s)$ are used for calculating the appearance ratio of the density gradation region in the calculation model of the equation (8). As described in the description of FIGS. 13A and 13B, the appearance ratio functions are used for modeling the structure of the dots in the gravure printing.

[Math 9]

$$RMSE = \sqrt{\frac{1}{n} \sum_{\lambda=380\,nm}^{730\,nm} (OD_s(\lambda) - OD'(s, \lambda))^2} \quad (9)$$

In the above-described equation (9), the density gradation appearance ratio calculation unit 203 calculates, for every command dot area ratio, a mean square error RMSE where an error between the calculated spectral-optical density $OD'(s, \lambda)$ and the measured spectral-optical density $OD_S(\lambda)$ in respective wavelengths $\lambda$ is squared and summed, using a step width of wavelength where wavelength $\lambda$ from 380 nm to 730 nm is divided into n steps.

As described above, the density gradation appearance ratio calculation unit 203 uses the calculation model of the equation (8), in the printed portion where inks (primary color inks) corresponding to the command dot area ratio are printed, for every density gradation included in the dots, the density gradation spectral-optical density $OD_{im}(\lambda)$ and the appearance ratio function of the density gradation $a_1(s)$, $a_2(s)$, $a_3(s)$, ..., $a_m(s)$ are multiplied, followed by addition of the multiplied results, whereby the spectral-optical density of the printed portion of the command dot area ratio is calculated.

The density gradation appearance ratio calculation unit 203 stores the appearance ratio functions $a_m(s)$ for every density gradation region into the density gradation appearance ratio table database 204, corresponding to the density gradation spectral-optical density for the density gradation region. Similarly, the density gradation appearance ratio calculation unit 203 stores the appearance ratio function $a_m(s)$ showing the appearance ratio of the density gradation regions for the command dot ratio, for other primary inks, into the density gradation appearance ratio table database 204.

In the case where the spot color ink, in which the primary color inks are mixed with a predetermined mixture ratio, is used, the appearance ratio functions $a_m(s)$ of the density gradation region for the above-described primary color inks are used, which are read from the density gradation appearance ratio table database 204. Here, an appearance ratio function $a_m(s)$ for any of the primary color inks to be mixed for producing the spot color ink may be used. Alternatively, appearance ratio functions $a_m(s)$ corresponding to the primary color inks to be mixed may be combined, depending on the mixture ratio.

When using this spot color ink, similar to the description for the spectral reflectance estimation unit 108, depending on the ratio of the primary color inks to be mixed, the scattering coefficient $S_t(\lambda)$ and the absorption coefficient $K_t(\lambda)$ of the spot color ink are calculated using the above-described equation (6).

In the above-described equation (6), the coefficients $\alpha$ and $\beta$ indicate a ratio at which the primary ink #1 and the primary ink #2 are mixed. The absorption coefficient $K_1(\lambda)$ of the primary ink #1 is multiplied by the coefficient $\alpha$ and the absorption coefficient $K_2(\lambda)$ of the primary ink #2 is multiplied by the coefficient $\beta$, and the multiplied values are added so as to obtain the absorption coefficient $K_t(\lambda)$ of the spot color ink. Similarly, the scattering coefficient $S_1(\lambda)$ of the primary ink #1 are multiplied by the coefficient $\alpha$ and the scattering coefficient $S_2(\lambda)$ of the primary ink #2 is multiplied by the coefficient $\beta$, and the multiplied values are added so as to obtain the scattering coefficient $S_t(\lambda)$ of the spot color ink.

Hereinafter, an operation of the spectral-optical density estimation unit 111 will be described.

The spectral-optical density estimation unit 111 is provided with an expanded Neugebauer primary color calculation unit 1111, an expanded Neugebauer primary color appearance ratio calculation unit 1112, a spectral-optical density calculation unit 1113 and a spectral reflectance calculation unit 1114.

The expanded Neugebauer primary color calculation unit 1111 determines, in accordance with the order of colors to be overlaid, an ink used for an under-coat ink (primary ink or spot color ink), and an ink printed on a surface of the under coating. The expanded Neugebauer primary color calculation unit 1111 reads the command dot area ratio of inks to be overlaid, from the input unit 101.

Moreover, the expanded Neugebauer primary color calculation unit 1111 reads the scattering coefficient $S(\lambda)$ and the absorption coefficient $K(\lambda)$ of the ink printed on the under coat ink (primary color inks or spot color ink). Next, as described in FIG. 15, the expanded Neugebauer primary color calculation unit 1111 substitutes the density gradation spectral reflectance $R_{im}(\lambda)$ of the under coat ink, the scattering coefficient $S(\lambda)$ and the absorption coefficient $K(\lambda)$ of the ink printed on the under coat ink, and the thickness coefficient $X_m$ of the density gradation region, for the equation (1) so as to calculate the density gradation spectral reflectance $R_{im}(\lambda)$ of the dots printed on the under coat ink.

In this case, the expanded Neugebauer primary color calculation section 1111 calculates the density gradation spectral reflectances $R_{im}(\lambda)$ of a dot of the ink to be overprinted on the dot of the ground ink, in respect of all the combinations of overlapped portions in each of which any of the density gradation areas in a dot of the ground ink overlaps with any of the density gradation regions in a dot of the ink to be overprinted on the dot of the ground. Then, the expanded Neugebauer primary color calculation section 1111 converts the obtained density gradation spectral reflectances $R_{im}(\lambda)$ of the ink to be overprinted on the dot of the ground ink to the respective density gradation spectral optical densities $OD_{im}(\lambda)$ using the equation (7). The expanded Neugebauer primary color calculation section 1111 stores the obtained density gradation spectral optical densities $OD_{im}(\lambda)$ into the expanded Neugebauer primary color table of the temporary memory unit 125.

Referring back to FIG. 12, an expanded Neugebauer primary color appearance ratio calculation unit 1112 calculates, similar to the description of FIGS. 17A and 17B, the appearance ratio of an overlaid portion between the density gradation region of the under coat ink and the density gradation region of the ink printed overlaying on the under coat ink.

As described in the section of the spectral reflectance estimation unit 108, an equation for the appearance ratio used for overlaid inks (primary color ink or spot color ink) is stored in the density gradation appearance ratio table database 204 as a table of the appearance ratio as shown in FIG. 18.

The expanded Neugebauer appearance ratio calculation unit 1112 reads the equation of the table in the density gradation appearance ratio table data base 204 which is shown FIG. 18, depending on a combination of type of the ink to be overlaid and the command dot area ratio showing the dots of the ink to be overlaid. Also, the expanded Neugebauer appearance ratio calculation unit 1112 reads, from the density gradation appearance ratio table database 204, respective appearance ratios $\alpha 1$, $\alpha 2$, $\beta 1$ and $\beta 2$ corresponding to the density gradation core region 1 and the density gradation fringe region 2 for cyan and magenta.

When cyan is used for the under coating and magenta is overlaid on the cyan, the expanded Neugebauer primary color calculation unit 1111 calculates the spectral reflectance $R_{KM}(\lambda)$ of the density gradation region in the overlaid portion in accordance with the equation (3), using the spectral reflectance of cyan as the ground spectral reflectance $R_0(\lambda)$ and the thickness of the density gradation region of magenta appearing based on the command dot area ratio.

For example, when calculating the spectral reflectance $R_{KM}(\lambda)$ in the region Q5, the expanded Neugebauer primary color calculation unit 1111 calculates the spectral reflectance $R_{KM}(\lambda)$ of a print portion in the overlaid portion where the magenta ink having a thickness of 100% is overlaid, using the density gradation spectral reflectance $R_{im}(\lambda)$ corresponding to a portion having 100% of thickness of the cyan ink on the print medium, as the ground spectral reflectance $R_0(\lambda)$. The expanded Neugebauer primary color calculation unit 1111 converts the calculated spectral reflectance $R_{KM}(\lambda)$ into the density gradation spectral-optical density $OD_{KM}(\lambda)$ based on the equation (7).

Similarly, when calculating the spectral reflectance $R_{KM}(\lambda)$ in the region Q7, the expanded Neugebauer primary color calculation unit 1111 calculates the spectral reflectance $R_{KM}(\lambda)$ in the case where magenta ink having a thickness of 100% is overlaid, using the density gradation spectral reflectance Rim ($\lambda$) corresponding to a portion having 50% of thickness of cyan ink on the print medium, as the ground spectral reflectance $R_0(\lambda)$. Also, the expanded Neugebauer primary color calculation unit 1111 converts, by using the equation (7), the calculated spectral reflectance $R_{KM}(\lambda)$ into the spectral-optical density $OD_{KM}(\lambda)$. Further, the spectral-optical density $OD_{KM}(\lambda)$ is calculated for all the combinations of the expanded Neugebauer primary color.

The spectral-optical density calculation unit 1113 multiplies respective spectral-optical densities corresponding to the expanded Neugebauer primary colors of the above-described regions Q1 to Q9 by the expanded Neugebauer primary color appearance ratio, and adds them for every wavelength.

The spectral-optical density calculation unit 1113 calculates an estimated spectral-optical density $OD_D(\lambda)$ of a print portion in the case where the dots of the magenta ink are printed being overlaid with respect to the print medium where the dots of cyan ink are printed.

The spectral reflectance calculation unit 1114 converts, by using the following equation (10), the estimated spectral-optical density $OD_D(\lambda)$ calculated by the spectral-optical density calculation unit 1113 into a second estimated spectral reflectance $R_{D2}(\lambda)$.

[Math 10]

$$R(\lambda)=e^{-D(\lambda)} \quad (10)$$

Hereinafter, an operation of the mix-estimation unit 114 will be described.

The mix-estimation unit 114 reads, from the estimation parameter database 126, a weighting coefficient w by which the first estimated spectral reflectance $R_{D1}(\lambda)$ and the second estimated spectral reflectance $R_{D2}(\lambda)$ are multiplied. For example, the mix-estimation unit 114 adds $wR_{D1}(\lambda)$ and $(1-w) R_{D2}(\lambda)$ so as to calculate an integrated estimated spectral reflectance $R_D(\lambda)$.

The color estimation table generation unit 109 determines an viewing light source and calculates tristimulus values XYZ or CIELAB value and generates the color estimation table which estimates the reproduced color. In other words, the color estimation table generation unit 109 generates a color estimation table which correlates input data (CMY value according to the present embodiment) information and the reproduced color information calculated from the integrated estimated spectral reflectance $R_D(\lambda)$. It should be noted that the color estimation table generation unit 109 generates the color estimation table using publicly known ICC (International Color Consortium) profile format and outputs them from the output unit 110.

Hereinafter, generation of the color estimation table will be described.

FIG. 19 is a flowchart showing an operation example of a generation process of a color estimation table performed by a color estimation table generation unit 109 according to the present embodiment.

At step S401, the expanded Neugebauer appearance ratio calculation unit 1082 reads, from the Neugebauer primary color table in the temporary memory unit 125, the spectral reflectance $R_{KM}(\lambda)$ of the Neugebauer primary color for the spot color ink of the overlaid portion. Similarly, the expanded Neugebauer appearance ratio calculation unit 1112 reads, from the Neugebauer primary color table in the temporary memory unit 125, the spectral-optical density $OD_{KM}(\lambda)$ of the Neugebauer primary color for the spot color ink of the overlaid portion.

At step S402, the mix-estimation unit 114 reads, from the estimation parameter database 126, a weighting coefficient w by which the first estimated spectral reflectance $R_{D1}(\lambda)$ and the second estimated spectral reflectance $R_{D2}(\lambda)$ are multiplied, when integrating the first estimated spectral reflectance $R_{D1}(\lambda)$ estimated by the spectral reflectance estimation unit 108 and the second estimated spectral reflectance $R_{D2}(\lambda)$ estimated by the spectral-optical density estimation unit 111.

At step S403, next, the expanded Neugebauer appearance ratio calculation unit 1082 extracts command dot area ratios, with witch the estimated colorimetric value has not calculated, from the matrix showing the command dot area ratios of the ink to be overlaid. The matrix is stored in the color estimation table of the temporary memory unit 125. Then, the expanded Neugebauer primary color appearance ratio calculation unit 1082 sets the extracted combination of the command dot area ratios to be a calculation object. The above-described processes may be performed by the expanded Neugebauer appearance ratio calculation unit 1112.

At step S404, the spectral reflectance estimation unit 108 calculates the first estimated spectral reflectance $R_{D1}(\lambda)$ based on the above-described combination of the command dot area ratios.

The spectral-optical density estimation unit 111 calculates the second estimated spectral reflectance $R_{D2}(\lambda)$ based on the above-described combination of the command dot area ratio.

Moreover, the mix-estimation unit 114 multiplies the first estimated spectral reflectance $R_{D1}(\lambda)$ and the second estimated spectral reflectance $R_{D2}(\lambda)$, by the weighting coefficient w obtained at step S402 and a value (1−w), and adds values $wR_{D1}(\lambda)$ and $(1-w) R_{D2}(\lambda)$ so as to obtain the integrated estimated spectral reflectance $R_D(\lambda)$. Further, the mix-estimation unit 114 sets a spectral distribution of an viewing light source and a standard observer for the calculated integrated estimated spectral reflectance $R_D(\lambda)$, thereby calculating the colorimetric value.

At step S405, the mix-estimation unit 114 stores the calculated colorimetric value into the color estimation table of the temporary memory unit 125, corresponding to a combination of the command dot area ratio of the ink (spot color ink or primary color inks) to be overlaid.

At step S406, the expanded Neugebauer appearance ratio calculation unit 1082 determines whether or not the integrated estimated spectral reflectance $R_D(\lambda)$ has been calculated for all combinations of the command dot area ratios in the color estimation table of the temporary memory unit 125.

Then, when the integrated estimated spectral reflectance $R_D(\lambda)$ has been calculated for all combination of the command dot area ratios, the expanded Neugebauer appearance ratio calculation unit 1082 advances the process to step S407. Meanwhile, when the integrated estimated spectral reflectance $R_D(\lambda)$ has not calculated for all combinations of the command dot area ratios, the expanded Neugebauer appearance ratio calculation unit 1082 advances the process to step S403. The above-described process may be performed by the expanded Neugebauer appearance ratio calculation unit 1112.

At step S407, color estimation table generation unit 109 reads the color estimation table data stored in the temporary memory unit 125, converts the data into a publicly known ICC profile format, and outputs the converted color estimation profile data from the output unit 110.

Hereinafter, generation of a spot color separation table will be described.

The spot color separation table generation unit 130 generates a spot color separation table which is in a spot color profile. The spot color separation table stores combinations of the command dot area ratios for spot color ink necessary for producing the colorimetric values specified by respective coordinates in the color space (L*a*b* color space according to the present embodiment) The coordinates are divided by a predetermined period and provided in a discrete manner. The spot color separation table is generated every combination of the spot color inks to be overprinted.

Specifically, the spot color separation table generation unit 130 generates a spot color separation table in which the input value such as XYZ or CIELAB corresponds to the output value of the command dot area ratio in the spot color ink, the output value being used for the reproduction, and stores the generated spot color separation table into the spot color separation table in the temporary memory unit 125. According to the present embodiment, the spot color separation table generation unit 130 converts the spot color separation table stored in the temporary memory unit 125 into a publicly known ICC profile format, and outputs the table to the spot color profile generation unit 14 or the reference image generation unit 17, from the output unit 110.

Figure 20:
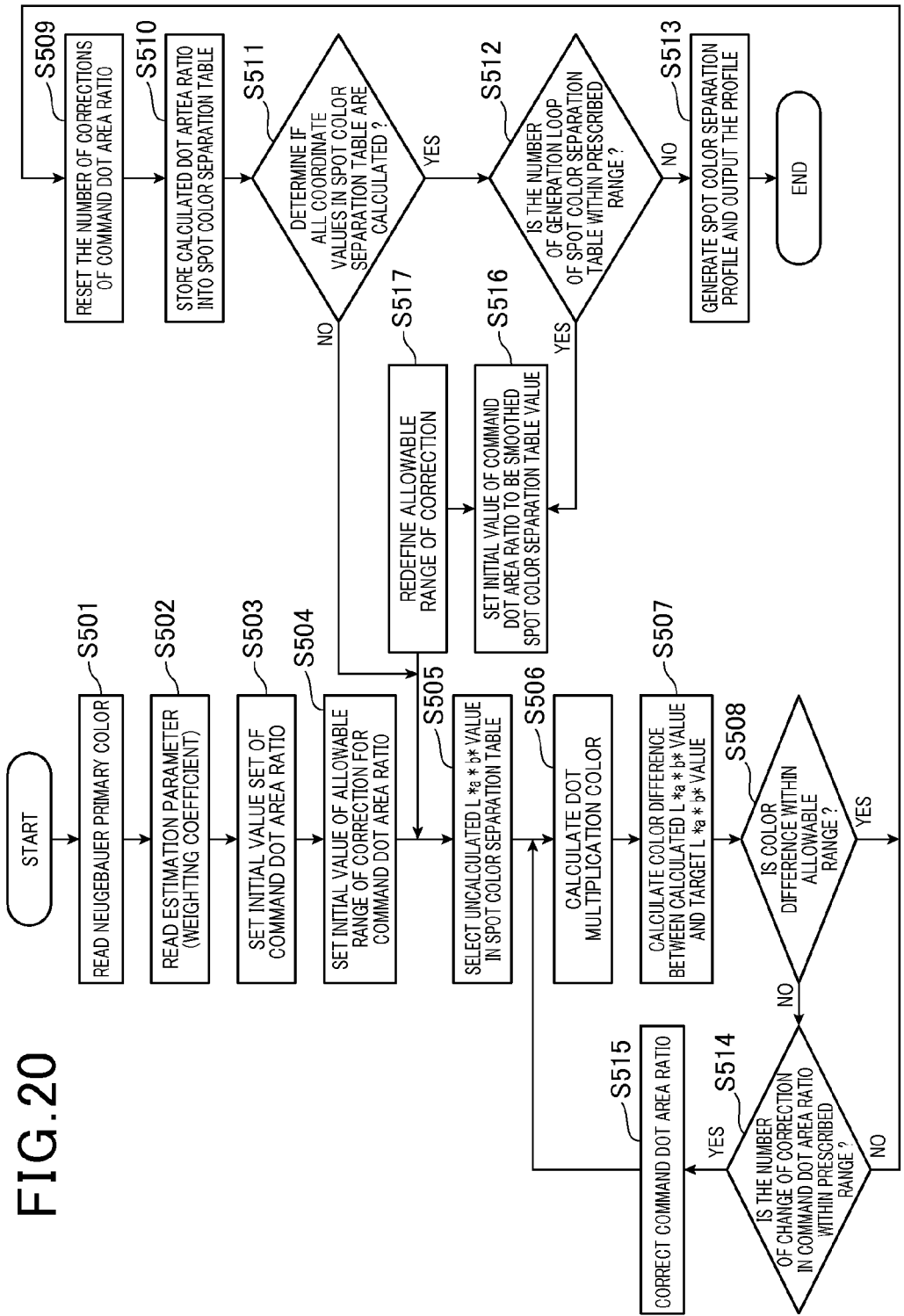
FIG. 20 is a flowchart showing an operation example of a generation process of a spot color separation table performed by a spot color separation table generation unit 130 according to the present embodiment.

FIG. 20 is a flowchart showing an operation example of a generation process of a spot color separation table performed by a spot color separation table generation unit 130 according to the present embodiment.

At step S501, the spot color separation table generation unit 130 reads, from the Neugebauer primary color table stored in the temporary memory unit 125, the spectral reflectance $R_{KM}(\lambda)$ of the Neugebauer primary color for the spot color ink of the overlaid portion.

At step S502, the spot color separation table generation unit 130 reads, from the estimation parameter database 126, a weighting coefficient w by which the first estimated spectral reflectance $R_{D1}(\lambda)$ estimated by the spectral reflectance estimation unit 108 and the second estimated spectral reflectance $R_{D2}(\lambda)$ estimated by the spectral-optical density estimation unit 111 are multiplied respectively.

At step S503, the spot color separation table generation unit 130 reads an initial value set of the command dot area ratio corresponding to each of the spot color inks to be combined, from the dot area ratio initial value set database 127 in which the initial value set of the command dot area ratio corresponding to each of the spot color inks to be combined are stored in advance.

Then, the spot color separation table generation unit 130 sets the read initial value to be an initial value of the command dot area ratio used for the following calculation.

At step S504, the spot color separation table generation unit 130 sets an allowable range of a change amount in the command dot area ratio when being corrected (adjusted).

At step S505, the spot color separation table generation unit 130 determines L*a*b* value of uncalculated coordinate (where the command dot area ratio to reproduce the L*a*b* value has not calculated) as a target L*a*b* value (purpose L*a*b* value), in the color space of the spot color separation table.

At this time, the spot color separation table generation unit 130 uses the read initial value as the command dot area ratio, when the number of times for the correction is zero.

At step S506, the spot color separation table generation unit 130 generates each of the first estimated spectral reflectance $R_{D1}(\lambda)$ and the second estimated spectral reflectance $R_{D2}(\lambda)$ with respect to the command dot area ratio, by using similar processes applied to the spectral reflectance estimation unit 108 and the spectral-optical density estimation unit 111.

Then, the spot color separation table generation unit 130 multiplies each of the first estimated spectral reflectance $R_{D1}(\lambda)$ and the second estimated spectral reflectance $R_{D2}(\lambda)$, by the read weighting coefficient w and a value (1−w). The spot color separation table generation unit 130 adds $wR_{D1}(\lambda)$ and $(1-w) R_{D2}(\lambda)$ so as to calculate the integrated estimated spectral reflectance $R_D(\lambda)$. Further, the spot color separation table generation unit 130 sets a spectral distribution of an viewing light source and a standard observer for the calculated integrated estimated spectral reflectance $R_D(\lambda)$, thereby calculating the colorimetric value.

At step S507, the spot color separation table generation unit 130 calculates a color difference between the target L*a*b* value and the L*a*b* value calculated from the integrated estimated spectral reflectance $R_D(\lambda)$.

At step S508, the spot color separation table generation unit 130 determines whether or not the color difference between the target L*a*b* value and the calculated L*a*b* value is within a predetermined range. At this time, the spot color separation table generation unit 130 advances the process to step S509 when the color difference is within in the predetermined range. Meanwhile, when the color difference is not within the predetermined range, the process proceeds to step S514.

At step S509, the spot color separation table generation unit 130 resets the number of counter for the correction and sets the number of correction to be zero.

At step S510, the spot color separation table generation unit 130 stores the command dot area ratio with witch current integrated estimated spectral reflectance $R_D(\lambda)$ is calculated, into the spot color separation table in the temporary memory unit 125, corresponding to the target L*a*b* value in the spot color separation table.

At step S511, the spot color separation table generation unit 130 determines whether or not all L*a*b* values in the coordinate value of the predetermined period in the color space of the spot color separation table have been calculated. At this time, the spot color separation table generation unit 130 advances the process to step S512 when all L*a*b* values in the color space are calculated. Meanwhile, when the all L*a*b* values are not calculated, the process proceeds to step S505.

At step S512, the spot color separation table generation unit 130 determines whether or not the number of generation loops of the spot color separation table is within a prescribed range.

At this time, the spot color separation table generation unit 130 advances the process to step S516 when the number of generation loops of the spot color separation table is within the prescribed range. Meanwhile, the process proceeds to step S513 when the number of generations of the spot color separation table is not within the prescribed range.

At step S513, the spot color separation table generation unit 130 reads the spot color separation table data stored in the temporary memory unit 125, converts them into the publicly known ICC profile format, and outputs the converted spot color separation profile data from the output unit 110.

At step S514, the spot color separation table generation unit 130 determines whether or not the number of corrections of the command dot area ratio is within a prescribed number. The spot color separation table generation unit 130 advances the process to step S515 when the number of correction of the command dot area ratio is within a prescribed range, and advances the process to step S509 when the number of corrections of the command dot area ratio exceeds the prescribed range.

At step S515, the spot color separation table generation unit 130 corrects each of the command dot area ratios corresponding to the spot color inks based on the change amount in the allowable range of the correction. At this time, the spot color separation table generation unit 130 increments (adds 1 to) the counter used for counting the number of corrections in the command dot area ratio.

At step S516, the spot color separation table generation unit 130 smoothes, for every spot color ink, the command dot area ratios corresponding to all L*a*b* values in the color space of the spot color separation table. As a smoothing method, any method may be used. For example, a value may be used in which the command dot area ratios being set with respect to adjacent coordinate values are averaged for every spot color ink, or a general smoothing filter may be applied to a three-dimensional space of the L*a*b* which is divided at a predetermined period.

The spot color separation table generation unit 130 determines a set of values of the smoothed command dot area ratio as a new initial value, instead of the initial value set of the command dot area ratio. At this time, the spot color separation table generation unit 130 increments the counter that counts the number of table generation loops.

At step S517, the spot color separation table generation unit 130 multiplies the allowable range of a change amount in the command dot area ratio by a predetermined ratio (e.g., 1/2) with respect to the current value thereof, so as to change (redefine) the allowable range to be smaller range. Moreover, all coordinates set in the color space specified by the color separation table are reset to an uncalculated state. Then, the spot color separation table generation unit 130 advances the process to step S505.

As described, according to the color estimation system 18 of the present embodiment, the system estimates the absorption properties and the scattering properties of a spot color ink from the primary color inks, and calculates the spectral reflectance of the spot color ink, whereby the spectral reflectance of the overlaid portion produced when the spot color inks are overprinted can be obtained.

Therefore, according to the color estimation system 18, in printing such as a gravure printing in which a color representation has an area coverage modulation representation and a density modulation representation, a color estimation of the reproduction color can readily be performed accurately for the printed matter where the spot color inks are overprinted.

Further, according the color estimation system 18, the estimated spectral reflectance $R_{D1}(\lambda)$ calculated from the spectral reflectance of the expanded Neugebauer primary color, and the appearance ratio thereof, and the estimation spectral reflectance $R_{D2}(\lambda)$ calculated from the spectral-optical density of the expanded Neugebauer primary color, and the appearance ratio thereof are mixed by the weighting coefficient w obtained in advance. Hence, a mixed estimated spectral reflectance $R_D(\lambda)$ can be obtained as an estimated spectral reflectance which is close to the actual measurement value thereof.

Figure 21:
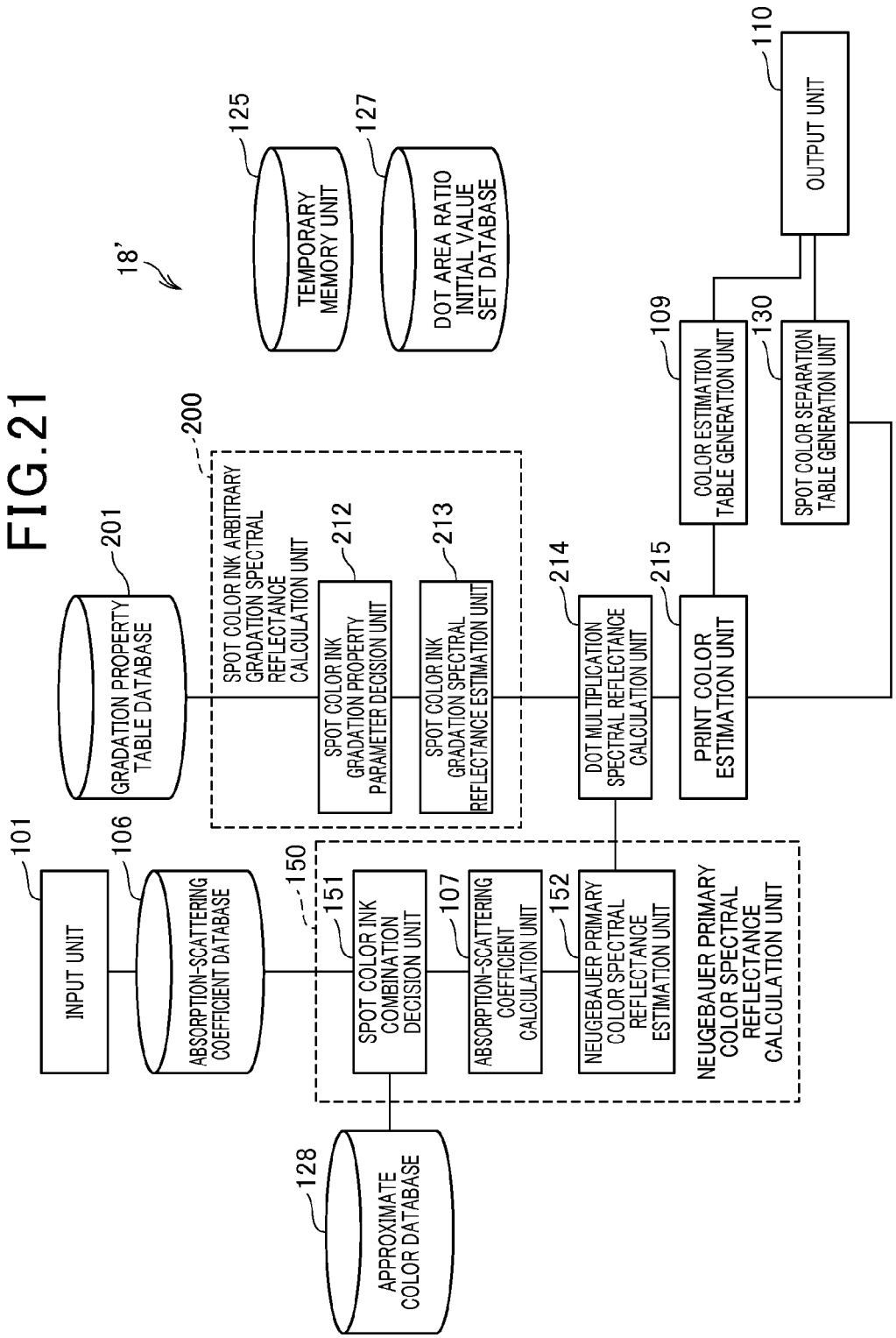
FIG. 21 is a block diagram showing a configuration example of another color estimation system 18' according to the present embodiment.

Hereinafter, with reference to the drawings, a configuration example of another color estimation system 18' will be described. FIG. 21 is a block diagram showing a configuration example of a color estimation system 18' which is another color estimation system according to the present embodiment.

In the configuration shown in FIG. 21, the same reference numbers are applied to configurations same as that of the color estimation system shown in FIG. 12. In FIG. 21, the color estimation system 18' is provided with the input unit 101, a gradation property table data base 201, the absorption/scattering coefficient database 106, the color estimation table generation unit 109, the output unit 110, the temporary memory unit 125, the dot area ratio initial value set data base 127, the approximate color database 128, the spot color separation table generation unit 130, a Neugebauer primary color spectral reflectance calculation unit 150, a spot color ink arbitrary gradation spectral reflectance calculation unit 200, a dot multiplication spectral reflectance calculation unit 214 and a print color estimation unit 215.

The Neugebauer primary color spectral reflectance calculation unit 150 calculates absorption/scattering properties of the spot color ink based on the scattering coefficient $S(\lambda)$ and the absorption coefficient $K(\lambda)$ of the primary ink stored in the absorption/scattering coefficient database 106, and calculates a spectral reflectance of the Neugebauer primary color based on these calculated coefficients.

The spot color ink arbitrary gradation spectral reflectance calculation unit 200 calculates gradation properties of the spot color ink using the gradation property table database 201 of the primary color inks, and calculates a spectral reflectance in an arbitrary gradation of the spot color ink based on the calculated spectral reflectance.

Hereinafter, operations of respective units in the Neugebauer primary color spectral reflectance calculation unit 150 and the spot color ink arbitrary gradation spectral reflectance calculation unit 200 will be described.

The Neugebauer primary color spectral reflectance calculation unit 150 is provided with the absorption/scattering coefficient calculation unit 107, a spot color ink combination decision unit 151 and a Neugebauer primary color spectral reflectance estimation unit 152. Also, the spot color ink arbitrary gradation spectral reflectance calculation unit 200 is provided with a spot color ink gradation property parameter decision unit 212 and a spot color ink gradation spectral reflectance estimation unit 213. The spot color ink combination decision unit 151 determines, in accordance with the flowchart in FIG. 14, a combination of the primary colors composing the spot color and the formulation ratio thereof, with respect to the spot color to which colorimetric values of the color samples are given.

In other words, the spot color ink combination decision unit 151 operates similarly to that of the spot color ink spectral reflectance calculation unit 121, and the spot color ink formulation ratio determination unit 122 in the first embodiment. The absorption/scattering coefficient calculation unit 107 calculates, similar to that of the first embodiment, the scattering coefficient $S_t(\lambda)$ and the absorption coefficient $K_t(\lambda)$ of the spot color ink, based on the formulation ratio of the primary color inks in the spot color ink determined by the spot color ink combination decision unit 151.

The Neugebauer primary color spectral reflectance estimation unit 152 substitutes the scattering coefficients $S_t(\lambda)$ and the absorption coefficient $K_t(\lambda)$ of the spot color ink, the ground spectral reflectance $R_0(\lambda)$ of the print medium and the thickness coefficient $X_m$ for the equation (3), thereby calculating the spectral reflectance of the solid spot color ink. Also, the Neugebauer primary color spectral reflectance estimation unit 152 calculates, based on the equation (3), a spectral reflectance (i.e., spectral reflectance of Neugebauer primary color) of the overlaid portion for all combinations of the spot colors to be used, including a combination of a plurality of spot colors (may contain primary color) to be used, when the printing order is specified. The calculated spectral reflectance of the Neugebauer primary color is stored in the Neugebauer primary color table in the temporary memory unit 125.

In the gradation property table database 201, a calculated parameter is stored in advance, showing a gradation properties of the primary color inks (gradation property parameter which will be described later). According to the present embodiment, a single color gradation properties is expressed by the following equation (11), where $a_1(\lambda)$ and $a_2(\lambda)$ are defined as gradation property parameters. Similar to that of the first embodiment, the gradation property parameters of the primary color inks can be obtained in advance so as to minimize the error produced between the measured spectral reflectance $R_s(\lambda)$ for every command dot area ratio and the calculated spectral reflectance calculated by the equation (11).

[Math 11]

$$R'(s, \lambda) = R_i(\lambda)a_1(s) + \left[\frac{R_i(\lambda)}{R_0(\lambda)}\right]^{1/2} R_0(\lambda)a_2(s) + R_0(\lambda)(1 - a_1(s) - a_2(s)) \quad (11)$$

where $R_i(\lambda)$: solid spectral reflectance of ink $i$
$R_0(\lambda)$: spectral reflectance of paper Similar to the spot color ink density gradation appearance calculation unit 123 in the first embodiment, the spot color ink gradation property parameter decision unit 212 reads the gradation properties of the primary color from the gradation property table database 201, based on the formulation ratio of the spot color determined by the above-described spot color ink combination decision unit 151 so as to determine the gradation properties of the spot color. Similar to the first embodiment, the gradation properties in any of read primary colors may be used as gradation properties, or a combination of gradation properties in respective primary colors may be used based on the formulation ratio. Further, the spot color ink gradation spectral reflectance estimation unit 213 reads the spectral reflectance of the solid spot color ink calculated by the Neugebauer primary color spectral reflectance estimation unit 152 and substitutes the read spectral reflectance together with the obtained gradation properties for the equation (11), thereby obtaining the spectral reflectance $R'(s, \lambda)$ corresponding to the respective command dot area ratio for every spot color ink and storing the spectral reflectance $R'(s, \lambda)$ into the spot color ink gradation spectral reflectance table in the temporary memory unit 125.

Figure 22:
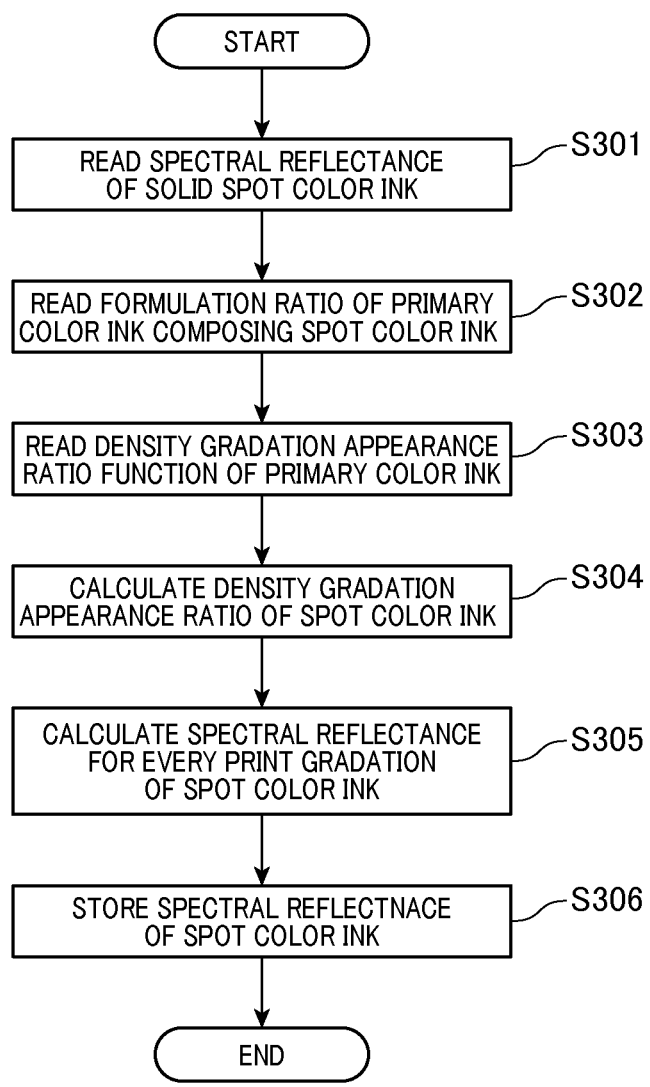
FIG. 22 is a flowchart showing a process of calculating spectral reflectance of the spot color ink on a gradation basis.

FIG. 22 is a flowchart showing a process for calculating spectral reflectance for respective gradations of the spot color ink.

At step S301, the spot color ink gradation spectral reflectance estimation unit 213 reads the spectral reflectance of the solid spot color ink used for calculating the spectral reflectance for every gradations, from the Neugebauer primary color table stored in the temporary memory unit 125.

At step S302, the spot color ink gradation spectral reflectance estimation unit 213 reads the above-described formulation ratio of the spot color ink, from the formulation ratio table in the temporary memory unit 125.

At step S303, the spot color ink gradation property parameter decision unit 212 reads the gradation property parameters $a_1(\lambda)$, $a_2(\lambda)$ of the primary color inks composing the spot color ink, from the gradation property table database 201.

At step S304, the spot color ink gradation property parameter decision unit 212 calculates the gradation property parameters $a_1(\lambda)$, $a_2(\lambda)$ of the spot color ink by using the above-described process, based on the gradation property parameters $a_1(\lambda)$, $a_2(\lambda)$ of the primary color inks which are read from the gradation property table database 201.

At step S305, the spot color ink gradation spectral reflectance estimation unit 213 calculates, based on the gradation property parameters $a_1(\lambda)$, $a_2(\lambda)$ calculated by the spot color ink gradation spectral parameter decision unit 212, the spectral reflectance $R'(s, \lambda)$ corresponding to the command dot area ratio of the spot color ink generated by mixing the primary color inks at a predetermined ratio in accordance with the above-described equation (11).

Then, at step S306, the spot color ink gradation spectral reflectance estimation unit 213 stores the calculated spectral reflectance $R'(s, \lambda)$ into the spot color gradation spectral reflectance table in the temporary memory unit 125.

The dot multiplication spectral reflectance calculation unit 214 reads the spectral reflectance $R'(s, \lambda)$ corresponding to the command dot area ratio of the spot color ink, from the spot color gradation spectral reflectance table in the temporary memory unit 125. Then, the multiplication reflectance calculation unit 214 substitutes the spectral reflectance $R'(s, \lambda)$, the spectral reflectance $R_{KM}(\lambda)$, the measurement spectral reflectance $R_0(\lambda)$ of a paper of the print-substrate, and the wavelength $\lambda$ for the following equation (12) so as to calculate an effective dot area ratio $a_{eff,1}(\lambda)$.

[Math 12]

$$a_{eff,i}(\lambda) = \frac{R'(s, \lambda) - R_0(\lambda)}{R_{KM}(\lambda) - R_0(\lambda)} \quad (12)$$

where $a_{eff,i}(\lambda)$: effective dot area ratio of ink
$R'(s, \lambda)$: spectral reflectance of gradation in command dot area ratio $S$ of ink
$R_{KM}(\lambda)$: spectral reflectance of solid ink
$R_0(\lambda)$: spectral reflectance of paper
$\lambda$: wavelength The multiplication reflectance calculation unit 214 calculates a spectral dot area ratio $F_{a,1}(\lambda)$ of Neugebauer primary color 1 based on a prescribed Neugebauer equation using the calculated effective dot area ratio $a_{eff,i}(k)$, where 1 represents Neugebauer primary color.

Also, multiplication reflectance calculation unit 214 substitutes the effective spectral dot area ratio $F_{a,1}(\lambda)$ of Neugebauer primary color 1, and the spectral reflectance $R_1(\lambda)$ of Neugebauer primary color for the following equation (13) so as to calculate the spectral reflectance $R_j(\lambda)$ of a reproduction color.

[Math 13]

$$R_j(\lambda) = \sum_l F_{a,l}(\lambda) R_l(\lambda) \qquad (13)$$

where $F_{a,l}(\lambda)$: effective spectral dot area ratio of Neugebauer primary color 1

$R_l(\lambda)$: spectral reflectance of Neugebauer primary color 1

$R_j(\lambda)$: estimated spectral reflectance

The print color estimation unit 215 sets a spectral distribution of an viewing light source and a standard observer for the spectral reflectance $R_j(\lambda)$ of the reproduction color, thereby obtaining the colorimetric value.

Then, the print color estimation unit 215 stores the colorimetric value calculated by the Neugebauer primary color spectral reflectance estimation unit 152 into the color estimation table in the temporary memory unit 125, corresponding to a combination of the command dot area ratio of the spot color ink to be overlaid.

Similar to the first embodiment, the color estimation table generation unit 109 controls the multiplication reflectance calculation unit 214 and the print color estimation unit 215 to calculate the colorimetric values corresponding to uncalculated combinations of the command dot area ratios in the estimation table of the temporary memory unit 125. Then, the color estimation table generation unit 109 calculates the colorimetric values for all combinations of the multiplication in the command dot area ratios stored in the color estimation table corresponding to the combinations of the prescribed spot color inks.

It should be noted that explanations for the output unit 110 and the spot color separation table generation unit 130 are omitted since the configuration thereof are the same as that of the first embodiment.

According to the second embodiment, to simplify the configurations, the estimated spectral reflectance calculated from the spectral reflectance of the Neugebauer primary color is used. However, similar to that of the first embodiment, a configuration may be used, in which the spectral-optical density of the Neugebauer primary color is calculated, adding a configuration to calculate the second estimated spectral reflectance calculated from the spectral-optical density, whereby the integrated estimated spectral reflectance $R_D(\lambda)$ is obtained, based on a mixed model of the first estimated spectral reflectance calculated from the spectral reflectance and the second estimated spectral reflectance calculated from the spectral-optical density. Hence, the colorimetric value of the print color is obtained in accordance with the integrated estimated spectral reflectance.

As described, according to the color estimation system 18' of the present embodiment, in a printing of the area modulation gradation expression such as an offset printing, the absorption properties and scattering properties of the spot color ink are estimated from the primary color inks, and the spectral reflectance of the spot color ink is calculated. Hence, the spectral reflectance is obtained for the overlaid portion when the spot color inks are overprinted.

Further, in the present embodiment, based on the spectral reflectance of the Neugebauer primary color, and the spectral reflectance of the arbitrary gradation in the spot color ink, the colorimetric values and the spectral reflectance of any colors reproduced by the multiplication of the dots, can be calculated, by using a spectral expanded Neugebauer mixed model.

According to another color estimation system 18' of the present embodiment, basic functions related to the present invention, that is, the properties of the spot color is obtained from the properties of the primary color inks, and based on this, the colorimetric values and the spectral reflectance of any color reproduced by the spot color ink are accurately obtained, can be achieved in any one of embodiments. According to the present embodiment, precise estimation accuracy can be achieved, when the embodiment is applied to a printing method of the area modulation gradation expression which expresses the gradations with a dot area.

Moreover, the present embodiment can provide a color estimation method of a spot color ink, capable of readily applying to any color estimation methods in accordance with an expansion of the traditional Neugebauer equation.

To achieve functions of the color estimation system 1 shown in FIG. 1 according to the present invention, a computer program may be used to control the color estimation in such a manner that the program is stored in a computer readable recording medium, from which a computer system reads the program to be executed thereby.

It should be noted that the computer system may include an operating system, i.e., OS, or hardware such as peripheral devices. Moreover, the computer system may include world wide web, i.e., www system provided with a website-provided environment. The computer readable medium refers to a portable medium such as a flexible disk, a magneto-optical disk, ROM or CD-ROM, and a memory device such as a hard disk integrated to a computer system. Further, the computer readable medium may include a device capable of storing data for a certain period of time, e.g., a volatile memory (e.g., RAM) device in a computer system serving as a server or a client when the program is transmitted through a communication line such as an internet network or a telephone line.

Furthermore, the above-described program may be transmitted to other computer system from the computer system provided with a memory device or the like storing this program, through a transmission medium or transmission waves in a transmission medium. Here, the transmission medium which transmits the program refers to a medium having a function of transmitting information, e.g., a network (communication network) such as internet, or a communication line such as a telephone line. Also, the above-described program may serve as a part of the above-described functions. Furthermore, the program may be configured as a so-called difference file (difference program) such that existing programs already stored in the computer system are combined to serve the above-described functions.

What is claimed is:

1. A color estimation system comprising:
   a correlation memory unit that stores a correlation model that accepts an input of an image or information of the image, and outputs an ink-color set that is a color combination of inks used in reproducing the image by printing; and
   a computer that extracts the ink-color set corresponding to a print image, which is an image to be printed, by providing an input of the print image or image information of the print image to the correlation model,
   wherein the correlation model is generated by performing machine learning that establishes a correlation between the image information and the ink-color set such that the ink-color set is outputted based on the image information, using a reference image of which the ink-color set necessary for printing is known in advance, wherein the image information refers to an image feature quantity defined as any one of: a histogram composed of numerical values corresponding to respective coordinates in a predetermined color space of each pixel in the image; numerical values corresponding to respective coordinates in a predetermined color space of a predetermined plurality of pixels in the image; and numerical values corresponding to respective coordinates in a predetermined color space of a representative color in a predetermined region, wherein the histogram is expressed by a function, the histogram having an envelope shape expressed by synthesizing a plurality of functions, the functions having respective coefficients used as the image feature quantity to estimate the outputted ink-color, wherein the computer is programmed to cause a display to display a selecting screen, the selecting screen permitting a user to change the color combination of the inks, and wherein the computer is programmed to receive a user's selection of a change to the color combination of the inks, and to cause inks to be generated which correspond to the outputted ink-color set.

2. The color estimation system of claim 1, wherein a print color is estimated using separation data of the reference image and the ink-color set of the reference image, thereby estimating colorimetric values in a printed reference image which is the reference image being printed; and the reference image or the image feature quantity of the reference image, and the ink-color set are used for data of the machine learning.

3. The color estimation system of claim 2, wherein the print color of the reference image is estimated based on colors of the inks or a spectral reflectance using a Kubelka-Munk equation, a core fringe model and a Neugebauer model.

4. The color estimation system of claim 1, wherein a color profile is set being correlated to a combination of dot area ratios of the inks in the ink-color set, the color profile being used for the print color in the ink-color set of an image desired to be reproduced by the printing.

5. The color estimation system of claim 1, wherein the separation data is generated corresponding to a combination of the ink in the ink-color set estimated by the color estimation system of claim 1, the separation data being generated so as to produce a plate for every color in the ink-color set.

6. The color estimation system of claim 1, wherein the computer is configured to cause the generated inks to be applied to a printing plate.

7. The color estimation system of claim 1, wherein the computer is configured to cause the inks to be generated in response to the change of the color combination by the user.

8. A color estimation method comprising steps of:

setting a print image which is an image to be printed or image information of the print image, to be an input;

providing the input to a correlation model, the correlation model being configured to accept image or image information and output an ink-color set as a combination of an ink used when the image is reproduced in a printing; and extracting, by a computer, the ink-color set corresponding to the print image from the correlation model in a color combination extracting process, wherein the correlation model is generated by performing machine learning that generates a correlation between the image information and the ink-color set such that the ink-color set is outputted based on the image information, using a reference image of which the ink-color set necessary for a printing is known in advance, wherein the image information refers to an image feature quantity defined as any one of: a histogram composed of numerical values corresponding to respective coordinates in a predetermined color space of each pixel in the image; numerical values corresponding to respective coordinates in a predetermined color space of a predetermined plurality of pixels in the image; and numerical values corresponding to respective coordinates in a predetermined color space of a representative color in a predetermined region, wherein the histogram is expressed by a function, the histogram having an envelope shape expressed by synthesizing a plurality of functions, the functions having respective coefficients used as the image feature quantity to estimate the outputted ink-color, wherein the computer is programmed to cause a display to display a selecting screen, the selecting screen permitting a user to change a color combination of inks, and wherein the computer is further programmed to receive a user's selection of a change to the color combination of the inks, and to cause inks to be generated which correspond to the outputted ink-color set.

9. A separation data generation method including a separation data generation process that generates a separation data producing a plate for every color in the ink-color set estimated in the color estimation method of claim 8.

10. The color estimation method of claim 8, further comprising applying the generated inks to a printing plate.

11. The color estimation method of claim 8, further comprising causing the inks to be generated in response to the change of the color combination by the user.

* * * * *